(12) United States Patent
Nakata et al.

(10) Patent No.: US 11,959,424 B2
(45) Date of Patent: Apr. 16, 2024

(54) GAS TURBINE OUTPUT CORRECTING METHOD, CONTROL METHOD, DEVICE FOR EXECUTING SAID METHODS, AND PROGRAM CAUSING COMPUTER TO EXECUTE SAID METHODS

(71) Applicant: MITSUBISHI HEAVY INDUSTRIES, LTD., Tokyo (JP)

(72) Inventors: Naoki Nakata, Yokohama (JP); Hidehiko Nishimura, Yokohama (JP); Jotaro Nakagawa, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/032,426

(22) PCT Filed: Jul. 26, 2021

(86) PCT No.: PCT/JP2021/027537
§ 371 (c)(1),
(2) Date: Apr. 18, 2023

(87) PCT Pub. No.: WO2022/091504
PCT Pub. Date: May 5, 2022

(65) Prior Publication Data
US 2023/0392558 A1 Dec. 7, 2023

(30) Foreign Application Priority Data
Oct. 26, 2020 (JP) .................. 2020-179110

(51) Int. Cl.
*F02C 9/50* (2006.01)
(52) U.S. Cl.
CPC ............ *F02C 9/50* (2013.01); *F05D 2270/05* (2013.01); *F05D 2270/313* (2013.01)

(58) Field of Classification Search
CPC ...... F02C 9/00; F02C 9/16; F02C 9/20; F02C 9/26; F02C 9/253; F02C 9/28; F02C 9/32;
(Continued)

(56) References Cited

U.S. PATENT DOCUMENTS

2007/0079593 A1 4/2007 Fujii et al.
2007/0271024 A1 11/2007 Fujii et al.
(Continued)

FOREIGN PATENT DOCUMENTS

JP 2007-77867 3/2007
JP 2007-309279 11/2007
JP 2017-141801 8/2017

OTHER PUBLICATIONS

International Search Report dated Sep. 7, 2021 in corresponding International Application No. PCT/JP2021/027537, with English language translation.
(Continued)

*Primary Examiner* — Steven M Sutherland
(74) *Attorney, Agent, or Firm* — Wenderoth, Lind & Ponack, L.L.P.

(57) ABSTRACT

An output corrector is provided with an adjustment coefficient creating unit which creates an adjustment coefficient, an output adjusting unit which adjusts a control output using the adjustment coefficient, and an output accepting unit which accepts an output from an output meter for detecting the output of a gas turbine. The adjustment coefficient creating unit includes a first coefficient element calculating unit which calculates a first coefficient element, a second coefficient element calculating unit which calculates a second coefficient element, and an adjustment coefficient calculating unit which calculates the adjustment coefficient using the first and second coefficient elements. The first coefficient element is the ratio of an immediately preceding
(Continued)

output in an immediately preceding time period, to a reference output at a reference time point in the past. The second coefficient element is the ratio of the current output in the current time period, to the immediately preceding output.

20 Claims, 16 Drawing Sheets

(58) Field of Classification Search
CPC .......... F02C 9/48; F02C 9/50; F05D 2270/05; F05D 2270/313
See application file for complete search history.

(56) References Cited

U.S. PATENT DOCUMENTS

| | | | |
|---|---|---|---|
| 2011/0004390 A1* | 1/2011 | Nomura | F02C 9/34 701/100 |
| 2012/0017600 A1* | 1/2012 | Saito | F02C 3/10 60/773 |
| 2013/0180250 A1* | 7/2013 | Harada | F02C 9/40 60/740 |
| 2018/0223743 A1* | 8/2018 | Yamamoto | F02C 7/228 |
| 2019/0063335 A1* | 2/2019 | Takaki | F02C 9/28 |

OTHER PUBLICATIONS

Written Opinion of the International Searching Authority dated Sep. 7, 2021 in corresponding International Application No. PCT/JP2021/027537, with English language translation.

\* cited by examiner

OUTPUT RECEPTION ROUTINE

FIG. 18

| OUTPUT | REFERENCE TIME (PLANNING TIME) | DURING CONSTRUCTION TRIAL OPERATION | DURING FIRST MAIN OPERATION | DURING SECOND MAIN OPERATION | DURING PERIODIC INSPECTION | DURING TRIAL OPERATION | DURING FIRST MAIN OPERATION | DURING SECOND MAIN OPERATION |
|---|---|---|---|---|---|---|---|---|
| e3 | 100 | 90 | 80 | 70 | — | 80 | 70 | 65 |
| e1 | — | 90/100 | 90/100 | 90/100 | — | 90/100 | 90/100 | 90/100 |
| e2 | — | 90/100 | 90/100 | 80/100 | — | 80/100 | 80/100 | 70/100 |
| 1500°CMW | — | 1 | 80/90 | 70/80 | — | 1 | 70/80 | 65/70 |
| K1 | — | 100 | 100 | 100 | — | 100 | 100 | 100 |
| 1500°CMWm | — | 9/10×1 | 9/10× 8/9 | 8/10× 7/8 | — | 8/10×1 | 8/10× 7/8 | 7/10× 65/70 |
| PW | — | 90= 100×0.9 | 80= 100×0.8 | 70= 100×0.7 | — | 80= 100×0.8 | 70= 100×0.7 | 65= 100×0.65 |
| K2 | — | 90 | 80 | 70 | — | 70 | 70 | 65 |
| PWm | — | 9/10×1 ÷9/10 | 9/10× 8/9÷ 9/10 | 8/10× 7/8÷ 9/10 | — | 8/10× 1÷ 9/10 | 8/10× 7/8÷ 9/10 | 7/10× 65/70÷ 9/10 |
|  | — | 90= 90÷1.0 | 90= 80÷0.89 | 90= 70÷0.78 | — | 79= 70÷0.89 | 90= 80÷0.78 | 90= 65÷0.72 |

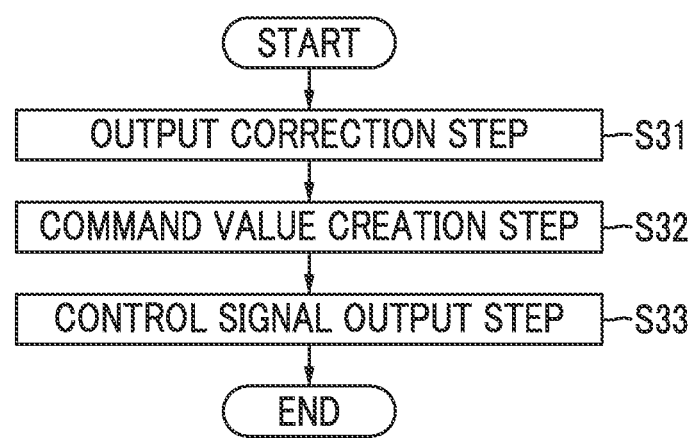

GAS TURBINE OUTPUT CORRECTING METHOD, CONTROL METHOD, DEVICE FOR EXECUTING SAID METHODS, AND PROGRAM CAUSING COMPUTER TO EXECUTE SAID METHODS

TECHNICAL FIELD

The present disclosure relates to an output correction method for a gas turbine, a control method, a device that executes the methods, and a program that causes a computer to execute the methods.

Priority is claimed on Japanese Patent Application No. 2020-179110, filed Oct. 26, 2020, the content of which is incorporated herein by reference.

BACKGROUND ART

The output of a gas turbine decreases due to a degradation in performance of the gas turbine such as a degradation or the like of a compressor caused by an operation for a long period of time. When a control target in the gas turbine is controlled, a control signal for the control target is created using a control output of the gas turbine. Even if the performance of the gas turbine degrades, when the control output is used as it is before the degradation in performance of the gas turbine, the control target cannot be appropriately controlled.

Therefore, the following PTL 1 discloses a method for correcting a control output. In this method, a correction control output is obtained by multiplying a control output of the gas turbine by a correction coefficient, and a control signal for a control target is created using the correction control output. For example, an output when the inlet gas temperature of the turbine reaches 1500° C. is provided as an example of the control output. In this method, in a case where there is a change in measured output from an output meter under certain conditions, a ratio between outputs before and after the change is used as the correction coefficient. Namely, the correction coefficient is the rate of decrease of the output after the change with respect to the output before the change.

CITATION LIST

Patent Literature

[PTL 1] Japanese Unexamined Patent Application Publication No. 2007-309279

SUMMARY OF INVENTION

Technical Problem

In the technique described in PTL 1, when the gas turbine is continuously operated for a long period of time, the control target can be appropriately controlled by correcting the control output using the correction coefficient that is the rate of decrease of the output of the gas turbine. However, in the technique described in PTL 1, for example, when the gas turbine is stopped after operation and the gas turbine is repaired to improve the performance of the gas turbine, the correction coefficient does not appropriately reflect the degree of degradation of the output. Therefore, in the technique described in PTL 1, a failure occurs in the control of the control target, which is a problem.

Therefore, an object of the present disclosure is to provide a technique for obtaining a control output capable of suppressing the occurrence of a control failure of a control target caused by a degradation in performance of a gas turbine.

Solution to Problem

According to one aspect to achieve the foregoing object, there is provided an output corrector for a gas turbine including a compressor that compresses air to generate compressed air, a combustor that combusts fuel in the compressed air to generate combustion gas, and a turbine to be driven by the combustion gas, the corrector including: a correction coefficient creation unit that creates a correction coefficient to be used when a control output of the gas turbine is corrected; an output correction unit that corrects the control output using the correction coefficient, and that outputs a corrected control output as a correction control output; an output reception unit that receives at least an output from an output meter that detects an output of the gas turbine; and an output storage unit that stores the output received by the output reception unit. The correction coefficient creation unit includes a first coefficient element calculation unit that calculates a first coefficient element, a second coefficient element calculation unit that calculates a second coefficient element, and a correction coefficient calculation unit that calculates the correction coefficient using the first coefficient element and the second coefficient element. The output storage unit stores a reference output that is an output under a condition where the gas turbine outputs a maximum output at a reference time in the past, and an immediately preceding output that the output reception unit receives under a condition where the gas turbine outputs a maximum output in an immediately preceding time period closer to a current time than to the reference time. The first coefficient element is a ratio of the immediately preceding output stored in the output storage unit to the reference output stored in the output storage unit. The second coefficient element is a ratio of a current output that the output reception unit receives under a condition where the gas turbine outputs a maximum output in a current time period between the immediately preceding time period and the current time, to the immediately preceding output stored in the output storage unit.

In this aspect, the correction coefficient is obtained using the first coefficient element and the second coefficient element. The correction coefficient is a value indicating the degree of degradation of the output caused by a degradation in performance of the gas turbine. In addition, the first coefficient element and the second coefficient element are also values indicating the degrees of degradation of the output caused by a degradation in performance of the gas turbine. However, the first coefficient element and the second coefficient element indicate the degrees of degradation of the output in different time periods. Specifically, the first coefficient element indicates a degradation in output from the reference time to the immediately preceding time period, and the second coefficient element indicates a degradation in output from the immediately preceding time period to the current time period. As described above, in this aspect, the correction coefficient is obtained using a plurality of the coefficient elements that are different from each other, and the control output is corrected with the correction coefficient.

Therefore, in this aspect, it is possible to obtain the correction control output that appropriately reflects the degree of degradation of the output.

According to one aspect to achieve the foregoing object, there is provided a control device for a gas turbine, the device including: the output corrector according to the one aspect; a command value creation unit that creates a command value for a control target of the gas turbine using the correction control output obtained by the output corrector; and a control signal output unit that outputs a control signal indicating the command value to the control target.

As described above, the output corrector of this aspect can obtain the correction control output that appropriately reflects the degree of degradation of the output. For this reason, it is possible to suppress the occurrence of a control failure of the control target by creating the command value for the control target using the correction control output, and by outputting the control signal indicating the command value to the control target.

According to one aspect to achieve the foregoing object, there is provided an output correction method for a gas turbine including a compressor that compresses air to generate compressed air, a combustor that combusts fuel in the compressed air to generate combustion gas, and a turbine to be driven by the combustion gas, the method including: executing a correction coefficient creation step of creating a correction coefficient to be used when a control output of the gas turbine is corrected; executing an output correction step of correcting the control output using the correction coefficient, and outputting a corrected control output as a correction control output; executing an output reception step of receiving at least an output from an output meter that detects an output of the gas turbine; and executing an output storage step of storing the output received in the output reception step. The correction coefficient creation step includes a first coefficient element calculation step of calculating a first coefficient element, a second coefficient element calculation step of calculating a second coefficient element, and a correction coefficient calculation step of calculating the correction coefficient using the first coefficient element and the second coefficient element. In the output storage step, a reference output that is an output under a condition where the gas turbine outputs a maximum output at a reference time in the past, and an immediately preceding output received in the output reception step under a condition where the gas turbine outputs a maximum output in an immediately preceding time period closer to a current time than to the reference time are stored. The first coefficient element is a ratio of the immediately preceding output stored in the output storage step to the reference output stored in the output storage step. The second coefficient element is a ratio of a current output received in the output reception step under a condition where the gas turbine outputs a maximum output in a current time period between the immediately preceding time period and the current time, to the immediately preceding output stored in the output storage step.

According to one aspect to achieve the foregoing object, there is provided a control method for a gas turbine, the method including: executing the output correction method according to the one aspect; executing a command value creation step of creating a command value for a control target of the gas turbine using the correction control output obtained by the output correction method; and executing a control signal output step of outputting a control signal indicating the command value to the control target.

According to one aspect to achieve the foregoing object, there is provided an output correction program for a gas turbine including a compressor that compresses air to generate compressed air, a combustor that combusts fuel in the compressed air to generate combustion gas, and a turbine to be driven by the combustion gas, the program causing a computer to execute: a correction coefficient creation step of creating a correction coefficient to be used when a control output of the gas turbine is corrected; an output correction step of correcting the control output using the correction coefficient, and outputting a corrected control output as a correction control output; an output reception step of receiving at least an output from an output meter that detects an output of the gas turbine; and an output storage step of storing the output received in the output reception step, in a storage device of the computer. The correction coefficient creation step includes a first coefficient element calculation step of calculating a first coefficient element, a second coefficient element calculation step of calculating a second coefficient element, and a correction coefficient calculation step of calculating the correction coefficient using the first coefficient element and the second coefficient element. In the output storage step, a reference output that is an output under a condition where the gas turbine outputs a maximum output at a reference time in the past, and an immediately preceding output received in the output reception step under a condition where the gas turbine outputs a maximum output in an immediately preceding time period closer to a current time than to the reference time are stored in the storage device. The first coefficient element is a ratio of the immediately preceding output stored in the storage device in the output storage step to the reference output stored in the storage device in the output storage step. The second coefficient element is a ratio of a current output received in the output reception step under a condition where the gas turbine outputs a maximum output in a current time period between the immediately preceding time period and the current time, to the immediately preceding output stored in the storage device in the output storage step.

According to one aspect to achieve the foregoing object, there is provided a control program for a gas turbine, which includes the output correction program according to the one aspect, the program causing the computer to execute: a command value creation step of creating a command value for a control target of the gas turbine using the correction control output obtained by executing the output correction program; and a control signal output step of outputting a control signal indicating the command value to the control target.

Advantageous Effects of Invention

In one aspect of the present disclosure, it is possible to obtain the control output capable of suppressing the occurrence of a control failure of the control target caused by a degradation in performance of the gas turbine.

BRIEF DESCRIPTION OF DRAWINGS

FIG. 18 is a description table showing changes in each coefficient element, each correction coefficient, and each correction control output over time according to one embodiment of the present disclosure.

FIG. 19 is a flowchart showing operation of the control device according to one embodiment of the present disclosure.

DESCRIPTION OF EMBODIMENTS

Hereinafter, one embodiment of an output corrector, a control device including the output corrector, and gas turbine equipment including the control device according to the present invention will be described with reference to the drawings.

Figure 1:
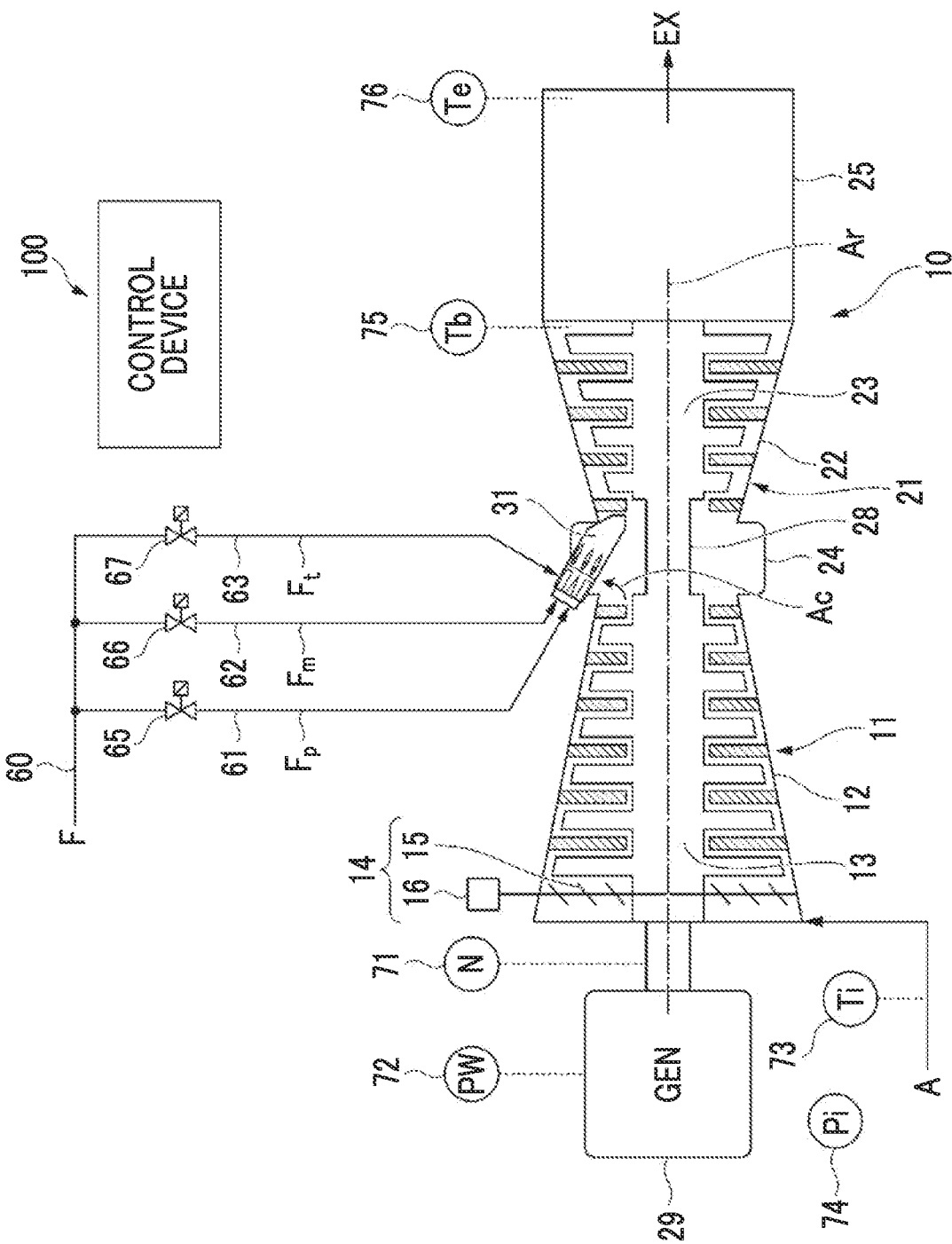
FIG. 1 is a schematic configuration view of gas turbine equipment according to one embodiment of the present disclosure.

As shown in FIG. 1, the gas turbine equipment of the present embodiment includes a gas turbine 10; a generator 29 that generates electricity through driving of the gas turbine 10; and a control device 100 that controls control targets in the gas turbine 10.

The gas turbine 10 includes a compressor 11 that compresses air A; a combustor 31 that combusts fuel F in the air compressed by the compressor 11, to generate combustion gas; and a turbine 21 to be driven by the combustion gas of high temperature and high pressure.

The compressor 11 includes a compressor rotor 13 that rotates about an axis Ar; a compressor casing 12 that rotatably covers the compressor rotor 13; and an inlet guide vane (IGV) 14 provided at a suction port of the compressor casing 12. The IGV 14 includes a plurality of guide vanes 15 and a driver 16 that drives the plurality of guide vanes 15. The IGV 14 regulates the flow rate of air to be sucked into the compressor casing 12.

The turbine 21 includes a turbine rotor 23 that is rotated about the axis Ar by the combustion gas from the combustor 31, and a turbine casing 22 that rotatably covers the turbine rotor 23. The turbine rotor 23 and the compressor rotor 13 are connected to each other so as to be rotatable about the same axis Ar, to form a gas turbine rotor 28. A rotor of the generator 29 is connected to the gas turbine rotor 28.

The gas turbine 10 further includes an intermediate casing 24 and an exhaust casing 25. The intermediate casing 24 is disposed between the compressor casing 12 and the turbine casing 22 in a direction in which the axis Ar extends, and connects the compressor casing 12 and the turbine casing 22. Compressed air Ac discharged from the compressor 11 flows into the intermediate casing 24. The exhaust casing 25 is disposed opposite a side on which the intermediate casing 24 is disposed, with respect to the turbine casing 22. Exhaust gas that is the combustion gas exhausted from the turbine 21 flows inside the exhaust casing 25.

Figure 2:
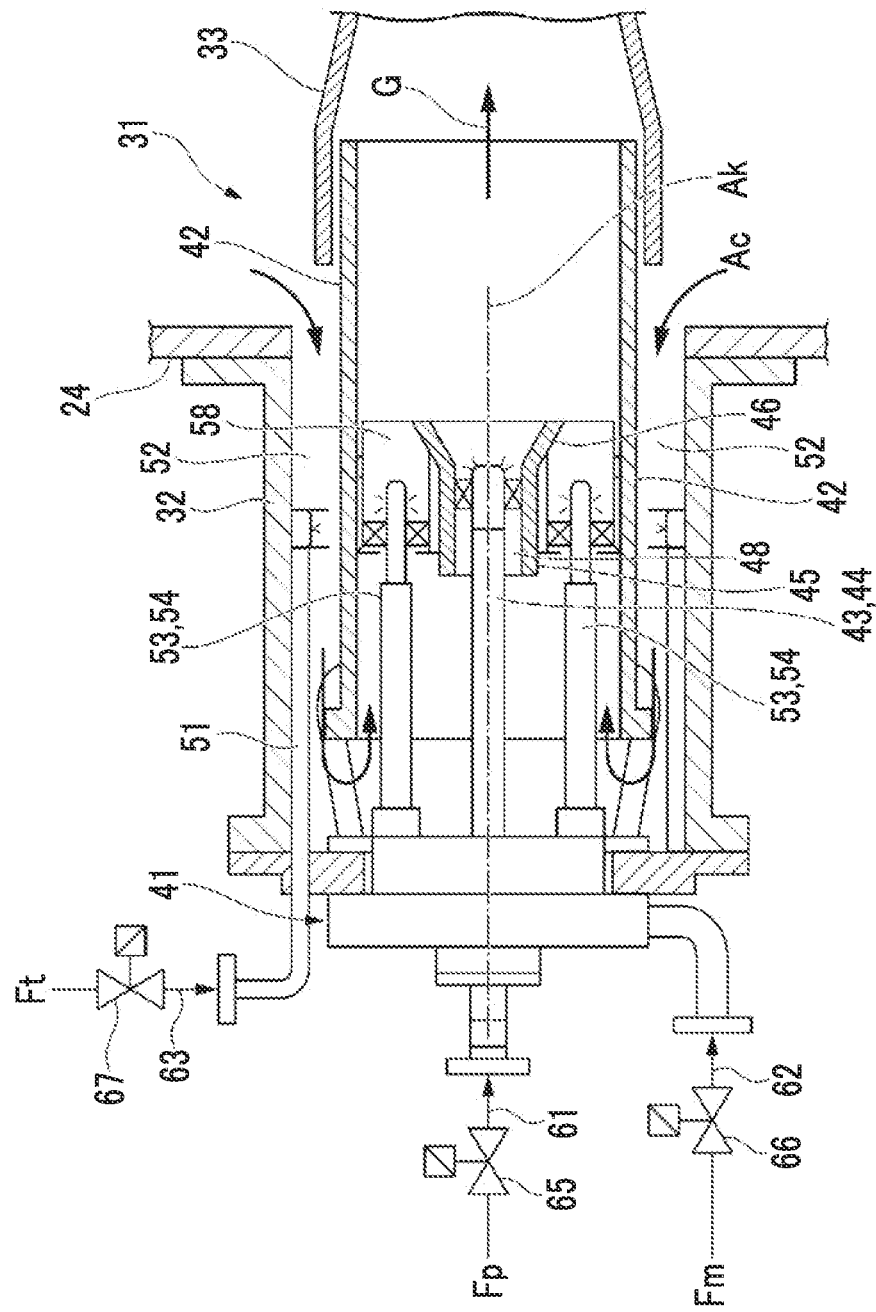
FIG. 2 is a cross-sectional view of a combustor according to one embodiment of the present disclosure.

The combustor 31 is fixed to the intermediate casing 24. As shown in FIG. 2, the combustor 31 includes an outer cylinder 32 fixed to the intermediate casing 24; a combustion cylinder (or a transition piece) 33 that is disposed inside the intermediate casing 24, and that delivers the combustion gas into a combustion gas flow path of the turbine 21; and a fuel nozzle 41 that sprays fuel and air into the combustion cylinder 33.

Figure 3:
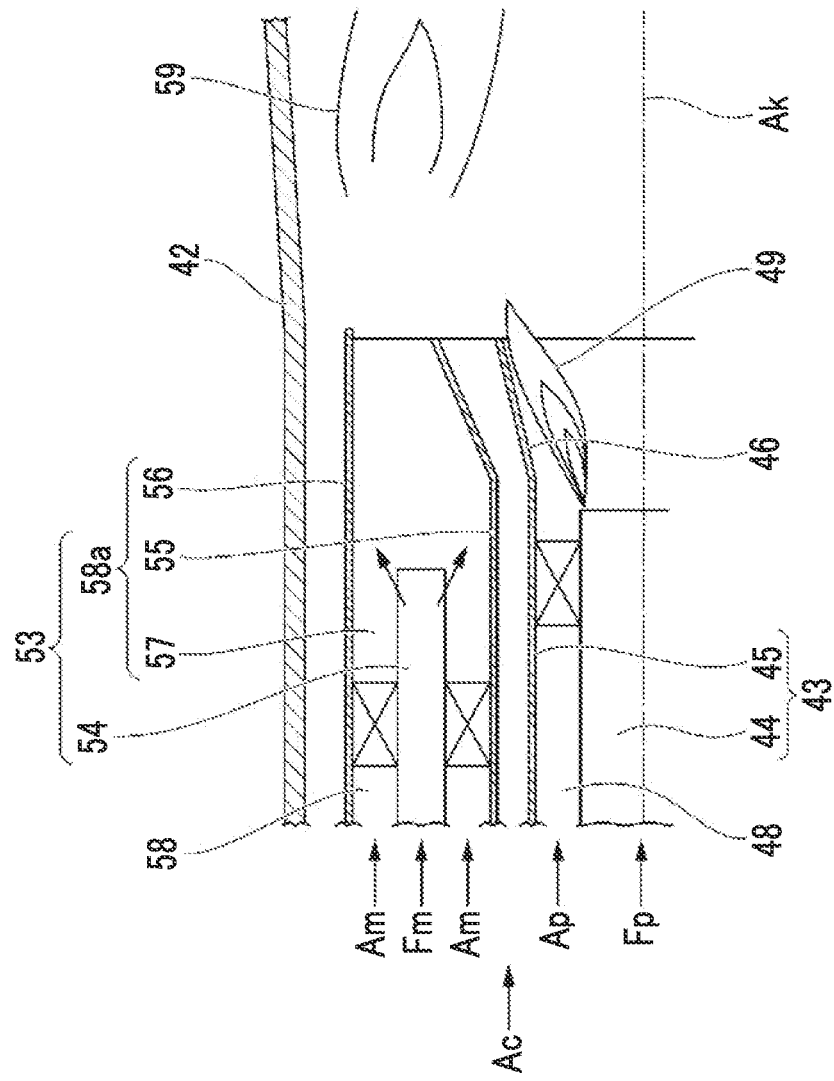
FIG. 3 is a cross-sectional view of main parts of the combustor according to one embodiment of the present disclosure.

As shown in FIGS. 2 and 3, the fuel nozzle 41 includes an inner cylinder 42; a pilot burner 43 disposed on a central axis Ak of the inner cylinder 42; a plurality of main burners 53 disposed around the pilot burner 43 at regular intervals in a circumferential direction; and a top hat nozzle 51 disposed on an inner peripheral side of the outer cylinder 32 and on an outer peripheral side of the inner cylinder 42. In the following description, a side to which combustion gas G flows inside the combustion cylinder 33 in a direction in which the central axis Ak of the inner cylinder 42 extends is referred to as a downstream side, and an opposite side is referred to as an upstream side.

The pilot burner 43 includes a pilot nozzle 44 disposed on the central axis Ak of the inner cylinder 42, and a pilot air cylinder 45 having a tubular shape and surrounding an outer periphery of the pilot nozzle 44. A downstream side of the pilot air cylinder 45 forms a pilot cone 46 that is gradually increased in diameter toward the downstream side. An inner peripheral side of the pilot air cylinder 45 forms a pilot air flow path 48 through which the compressed air Ac from the compressor 11 flows as pilot air Ap. Pilot fuel Fp sprayed from the pilot nozzle 44 is combusted in the pilot air Ap sprayed from the pilot air flow path 48 (diffusion combustion), to form a diffusion flame 49.

The main burner 53 includes a main air inner cylinder 55 having a tubular shape and surrounding an outer periphery of the pilot air cylinder 45; a main air outer cylinder 56 having a tubular shape and surrounding an outer periphery of the main air inner cylinder 55; partition plates 57 that divide an annular space between an outer peripheral side of the main air inner cylinder 55 and an inner peripheral side of the main air outer cylinder 56 into a plurality of spaces in the circumferential direction; and main nozzles 54 disposed between a plurality of the partition plates 57. The plurality of spaces defined by the main air inner cylinder 55, the main air outer cylinder 56, and the plurality of partition plates 57 form a main air flow path 58 through which the compressed air Ac from the compressor 11 flows as main air Am. Main fuel Fm is sprayed to the main air Am flowing through the main air flow path 58, from the main nozzles 54 disposed in the main air flow path 58. For this reason, a premixed gas in which the main air Am and the main fuel Fm are mixed flows on a downstream side of tips (downstream ends) of the main nozzles 54 in the main air flow path 58. When the premixed gas flows out from the main air flow path 58, the premixed gas is combusted (premixed combustion) to form a premixed flame 59. The above-described diffusion flame 49 plays a role of holding the premixed flame 59.

A space between the inner peripheral side of the outer cylinder 32 and the outer peripheral side of the inner cylinder 42 forms a compressed air flow path 52 that guides the compressed air Ac from the compressor 11 into the inner cylinder 42. The top hat nozzle 51 sprays top hat fuel Ft into the compressed air flow path 52. For this reason, when the top hat fuel Ft is sprayed into the compressed air flow path 52, the top hat fuel Ft is mixed in the main air Am and the pilot air Ap.

As shown in FIGS. 1 and 2, the gas turbine equipment of the present embodiment further includes a pilot fuel line 61 that delivers the pilot fuel Fp to the pilot nozzle 44; a main fuel line 62 that delivers the main fuel Fm to the main nozzles 54; a top hat fuel line 63 that delivers the top hat fuel Ft to the top hat nozzle 51; a pilot fuel valve 65 that regulates the flow rate of the pilot fuel Fp; a main fuel valve 66 that regulates the flow rate of the main fuel Fm; and a top hat fuel valve 67 that regulates the flow rate of the top hat fuel Ft.

All the pilot fuel line 61, the main fuel line 62, and the top hat fuel line 63 are lines branched from a fuel line 60. The pilot fuel valve 65 is provided in the pilot fuel line 61, the main fuel valve 66 is provided in the main fuel line 62, and the top hat fuel valve 67 is provided in the top hat fuel line 63.

The control targets of the gas turbine 10 in the present embodiment are the pilot fuel valve 65, the main fuel valve 66, the top hat fuel valve 67, and the IGV 14.

As shown in FIG. 1, the gas turbine equipment of the present embodiment further includes a rotation speed meter 71 that detects a rotation speed N of the gas turbine rotor 28; an output meter 72 that detects an output PW of the generator 29; an intake air temperature sensor 73 that detects an intake air temperature Ti which is a temperature of air A suctioned by the compressor 11; an intake air pressure gauge 74 that detects an intake air pressure (atmospheric pressure) Pi that is a pressure of the air suctioned by the compressor 11; a blade path temperature sensor 75 that detects a blade path temperature Tb which is a temperature of the combustion gas immediately after a final stage of the turbine 21; and an exhaust gas temperature sensor 76 that detects an exhaust gas temperature Te inside the exhaust casing 25 on a downstream side of the final stage of the turbine 21.

Figure 4:
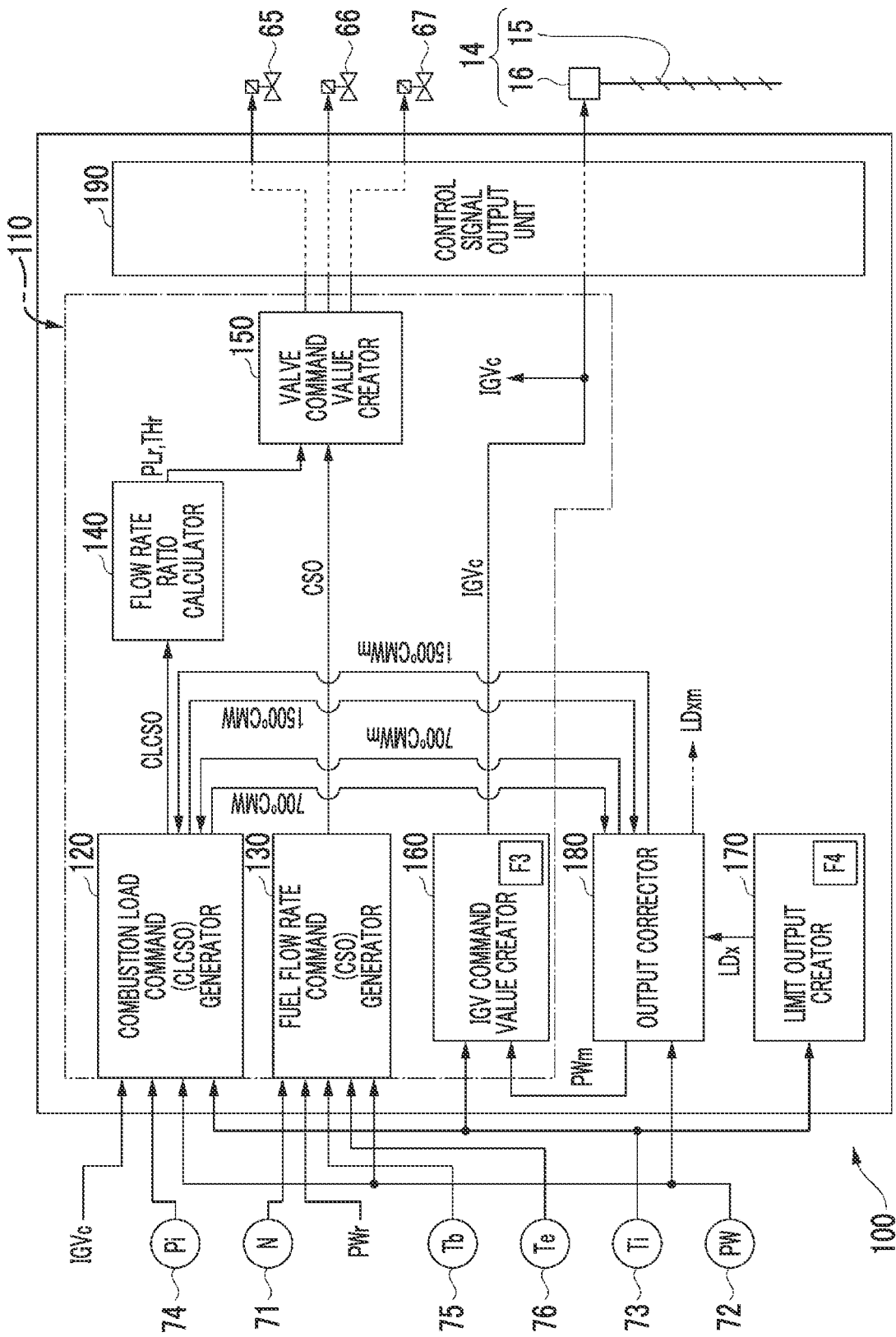
FIG. 4 is a functional block diagram of a control device according to one embodiment of the present disclosure.

As shown in FIG. 4, the control device 100 includes a command value creation unit 110 that creates a command value for a control target of the gas turbine 10; a control signal output unit 190 that outputs a control signal indicating the command value to the control target; a limit output creator 170 that creates a limit output of the gas turbine 10 according to the intake air temperature Ti; and an output corrector 180 that corrects a control output of the gas turbine 10.

The command value creation unit 110 includes a combustion load command generator 120 that generates a combustion load command value CLCSO; a fuel flow rate command generator 130 that generates a fuel flow rate command value CSO; a flow rate ratio calculator 140 that calculates fuel flow rate ratios (PLr and THr); a valve command value creator 150 that creates a valve command value for each of the fuel valves 65, 66, and 67; and an IGV command value creator 160 that creates an IGV command value indicating an IGV opening degree.

The combustion load command value CLCSO is a dimensionless parameter of temperature of the combustion gas at an inlet of the turbine 21 (hereinafter, referred to as an inlet temperature), and is a parameter having a positive correlation with the inlet temperature. The combustion load command value CLCSO is set to be 0% when the inlet temperature is a lower limit value, and to be 100% when the inlet temperature is an upper limit value. For example, when the lower limit value of the inlet temperature is 700° C. and the upper limit value of the inlet temperature is 1500° C., the combustion load command value CLCSO is expressed by the following equation.

CLCSO (%)={(measured value of gas turbine output−700° C.MW)/(1500° C.MW−700° C.MW)}×100

700° C. MW is a gas turbine output when the inlet temperature is 700° C. which is the lower limit value, and 1500° C. MW is a gas turbine output when the inlet temperature is 1500° C. which is the upper limit value. The gas turbine output herein is a generator output.

Figure 5:
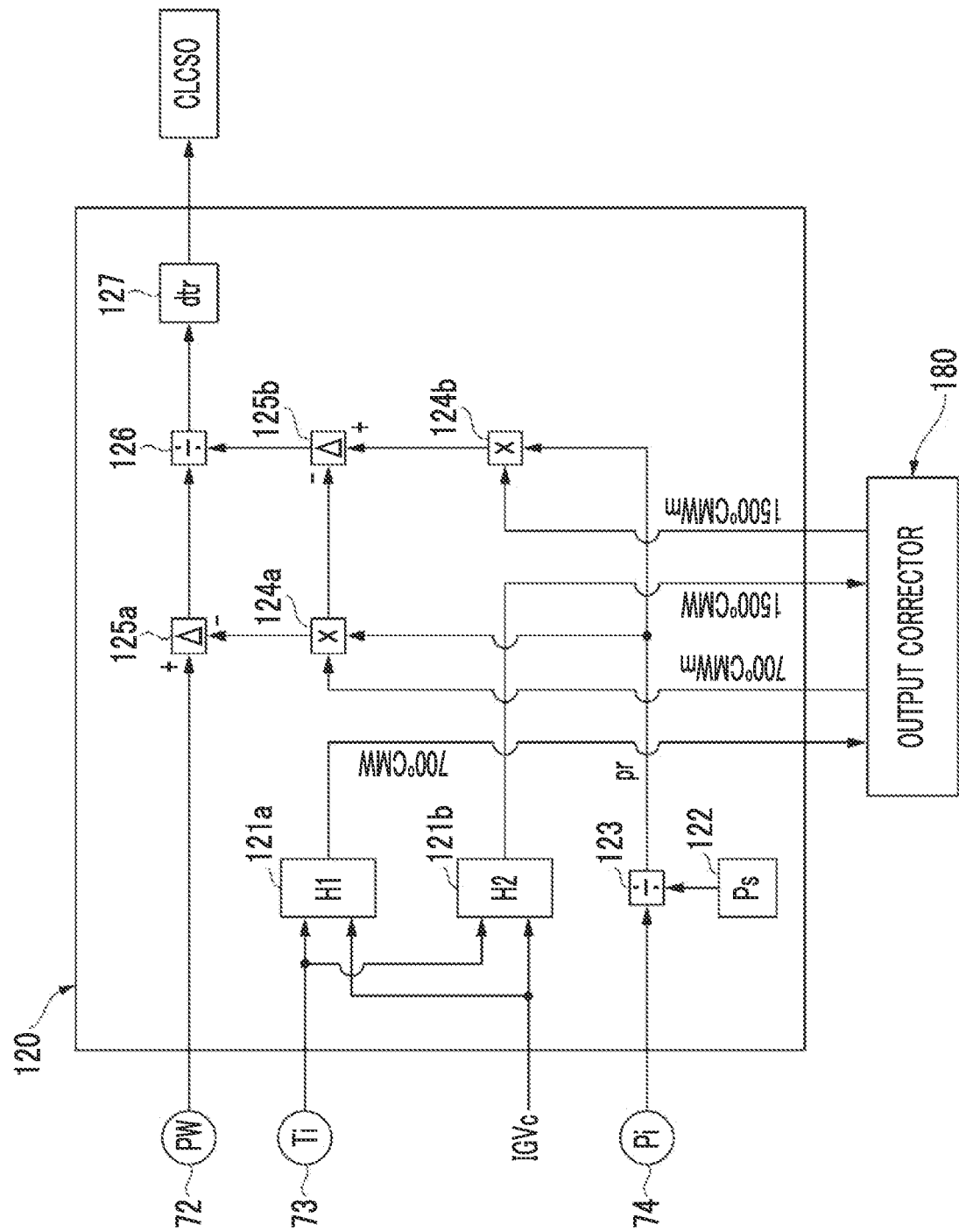
FIG. 5 is a functional block diagram of a combustion load command generator according to one embodiment of the present disclosure.

As shown in FIG. 5, the combustion load command generator 120 includes a 700° C. MW computation unit 121a, a 1500° C. MW computation unit 121b, a standard atmospheric pressure generator 122, a first divider 123, a first multiplier 124a, a second multiplier 124b, a first subtractor 125a, a second subtractor 125b, a second divider 126, and a limiter 127.

The 700° C. MW computation unit 121a obtains the gas turbine output 700° C. MW when the inlet temperature is 700° C., using a function H1 with the intake air temperature Ti and an IGV command value IGVc as variation parameters. In addition, the 1500° C. MW computation unit 121b obtains the gas turbine output 1500° C. MW when the inlet temperature is 1500° C., using a function H2 with the intake air temperature Ti and the IGV command value IGVc as variation parameters. Here, the IGV command value IGVc is a command value that is provided to the driver 16 of the IGV 14 by the control device 100. The MW computation units 121a and 121b change known values of 700° C. MW and 1500° C. MW in a case where the intake air temperature and the IGV command value IGVc are reference values, to values corresponding to the actual intake air temperature Ti and the IGV command value IGVc, and output the changed values as 700° C. MW and 1500° C. MW.

Both 700° C. MW and 1500° C. MW are one type of control output of the gas turbine 10. 700° C. MW is corrected to correction 700° C. MWm by the output corrector 180. In addition, 1500° C. MW is corrected to correction 1500° C. MWm by the output corrector 180. Both the correction 700° C. MWm and the correction 1500° C. MWm are one type of correction control output of the gas turbine 10.

The correction 700° C. MWm and the correction 1500° C. MWm from the output corrector 180 are corrected based on a measured value Pi of the intake air pressure (atmospheric pressure). Specifically, the first divider 123 obtains an intake air pressure ratio Pr that is a ratio of the intake air pressure (atmospheric pressure) Pi detected by the intake air pressure gauge 74, to a standard intake air pressure (standard atmospheric pressure) Ps from the standard atmospheric pressure generator 122. The first multiplier 124a corrects the correction 700° C. MWm to a value corresponding to the intake air pressure ratio Pr, by multiplying the correction 700° C. MWm from the output corrector 180 by the intake air pressure ratio Pr. The second multiplier 124b corrects the correction 1500° C. MWm to a value corresponding to the intake air pressure ratio Pr, by multiplying the correction 1500° C. MWm from the output corrector 180 by the intake air pressure ratio Pr.

Namely, in the above description, the known values of 700° C. MW and 1500° C. MW in a case where the intake air temperature and the IGV command value IGVc are the reference values are corrected to values corresponding to the measured intake air temperature Ti, the IGV command value IGVc, and the measured intake air pressure ratio Pr. The first subtractor 125a subtracts the correction 700° C. MWm corrected with the intake air pressure ratio Pr, from the measured output PW of the gas turbine 10 detected by the output meter 72. Namely, the first subtractor 125a obtains a value of the numerator of the above equation. The second subtractor 125b subtracts the correction 700° C. MWm corrected with the intake air pressure ratio Pr, from the correction 1500° C. MWm corrected with the intake air pressure ratio Pr.

Namely, the second subtractor 125b obtains a value of the denominator of the above equation.

The second divider 126 divides the value of the numerator of the above equation obtained by the first subtractor 125a by the value of the denominator of the above equation obtained by the second subtractor 125b, and outputs the value as the combustion load command value. The limiter 127 limits an increase and decrease rate of the combustion load command value such that the increase and decrease rate, which is the amount of change per unit time in the combustion load command value from the second divider 126, becomes equal to or less than a value determined in advance.

In the above description, the lower limit value of the inlet temperature of the combustion gas in the turbine 21 is 700° C., and the upper limit value is 1500° C.; however, depending on the model of the combustor 31 or the like, the lower limit value and the upper limit value of the inlet temperature of the combustion gas in the turbine 21 may be set to values different from the above examples.

The combustion load command value CLCSO that is limited in the increase and decrease rate by the limiter 127 is output from the combustion load command generator 120.

Figure 6:
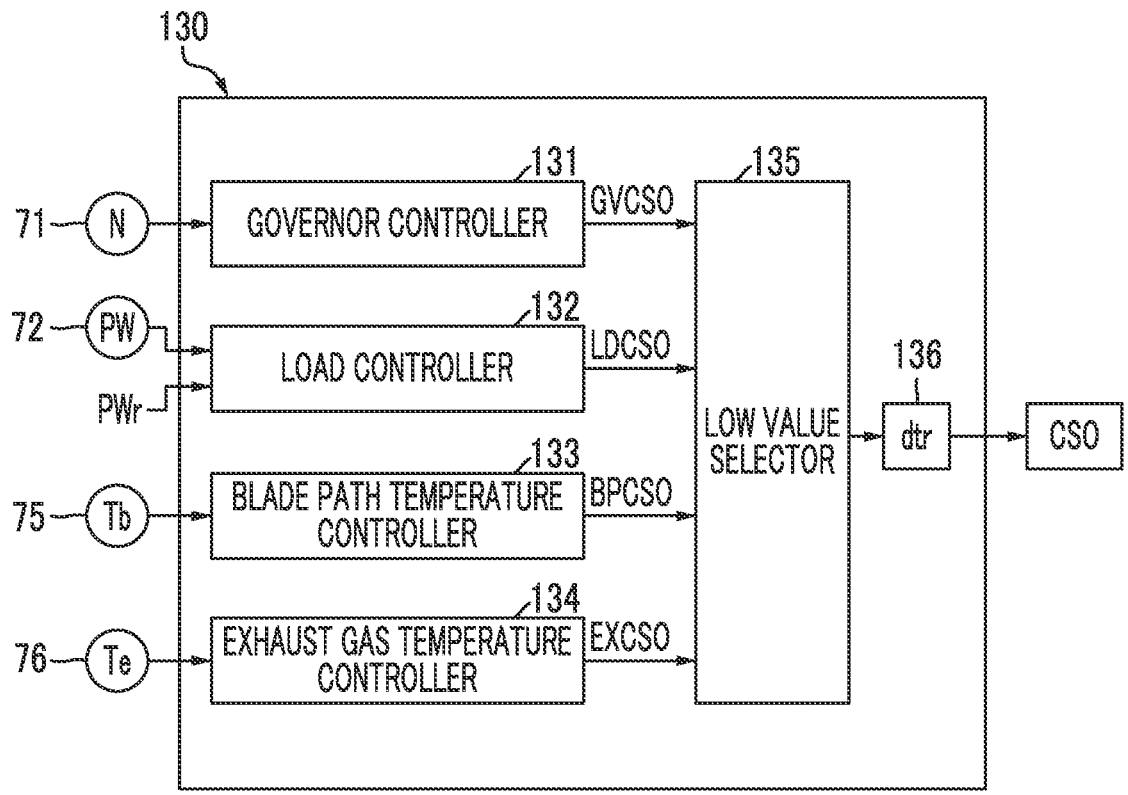
FIG. 6 is a functional block diagram of a fuel flow rate command generator according to one embodiment of the present disclosure.

The fuel flow rate command value CSO is a value indicating the total flow rate of the fuel to be supplied to the combustor 31 (hereinafter, referred to as a total fuel flow rate). Therefore, the fuel flow rate command generator 130 obtains the total fuel flow rate. As shown in FIG. 6, the fuel flow rate command generator 130 includes a governor controller 131, a load controller 132, a blade path temperature controller 133, an exhaust gas temperature controller 134, a low value selector 135, and a limiter 136.

The governor controller 131 receives the rotation speed N of the gas turbine rotor 28 from the rotation speed meter 71. Then, the governor controller 131 outputs a command value GVCSO to control the total fuel flow rate such that the rotation speed N of the gas turbine rotor 28 coincides with a target rotation speed. Specifically, the governor controller 131 compares the measured rotation speed N of the gas turbine rotor 28 and a GV set value set in advance, and outputs a proportional control signal as the command value GVCSO.

The load controller 132 receives the measured output PW of the gas turbine 10 from the output meter 72, and receives a demand output PWr for the gas turbine 10 from a higher-level control device. Then, the load controller 132 outputs a command value LDCSO to control the total fuel flow rate such that the measured output PW coincides with the demand output PWr. Specifically, the load controller 132 compares the measured output PW and the demand output PWr, performs proportional integration computation, and outputs the result as the command value LDCSO.

The blade path temperature controller 133 receives the blade path temperature Tb from the blade path temperature sensor 75. Then, the blade path temperature controller 133 outputs a command value BPCSO to control the total fuel flow rate such that the blade path temperature Tb does not become higher than an upper limit value. Specifically, the blade path temperature controller 133 compares the measured blade path temperature Tb and the upper limit value thereof, performs proportional integration computation, and outputs the result as the command value BPCSO.

The exhaust gas temperature controller 134 receives the exhaust gas temperature Te from the exhaust gas temperature sensor 76. Then, the exhaust gas temperature controller 134 outputs a command value EXCSO to control the total fuel flow rate such that the exhaust gas temperature Te does not become higher than an upper limit value. Specifically, the exhaust gas temperature controller 134 compares the measured exhaust gas temperature Te and the upper limit value thereof, performs proportional integration computation, and outputs the result as the command value EXCSO.

The low value selector 135 selects a minimum command value among the command values from the controllers 131 to 134, and outputs the command value. The limiter 136 limits the increase and decrease rate of the command from the low value selector 135, and outputs the result as a fuel flow rate command value (total fuel flow rate command value) CSO.

Figure 7:
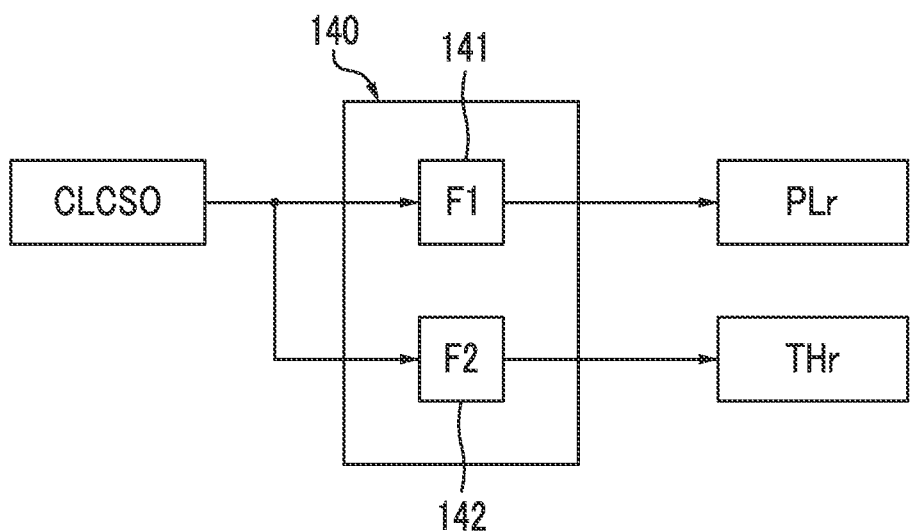
FIG. 7 is a functional block diagram of a flow rate ratio calculator according to one embodiment of the present disclosure.

The flow rate ratio calculator 140 obtains a pilot ratio PLr that is a ratio of a pilot fuel flow rate Fpf to the total fuel flow rate, and a top hat ratio THr that is a ratio of a top hat fuel flow rate Ftf to the total fuel flow rate. As shown in FIG. 7, the flow rate ratio calculator 140 includes a pilot ratio calculator 141 and a top hat ratio calculator 142.

Figure 10:
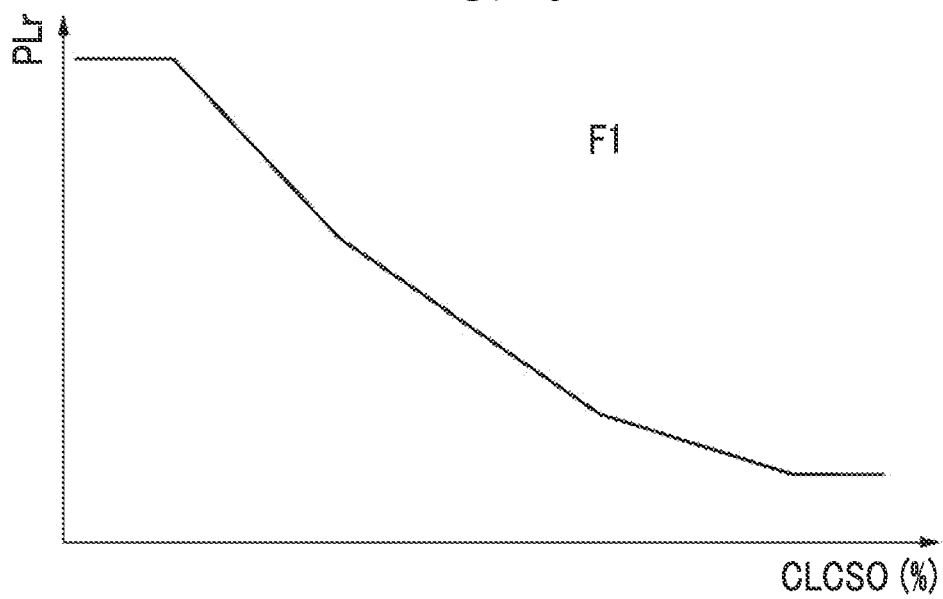
FIG. 10 is a graph for describing a function F1 according to one embodiment of the present disclosure.

The pilot ratio calculator 141 has a function F1 that defines a relationship between the pilot ratio PLr and the combustion load command value CLCSO having a positive correlation with the inlet temperature of the combustion gas in the turbine 21. As shown in FIG. 10, the function F1 is a function in which the pilot ratio PLr gradually decreases as the combustion load command value CLCSO increases, namely, as the inlet temperature of the combustion gas increases. The pilot ratio calculator 141 receives the combustion load command value CLCSO from the combustion load command generator 120. Then, the pilot ratio calculator 141 obtains the pilot ratio PLr corresponding to the combustion load command value CLCSO, using the function F1. Here, the relationship between the combustion load command value CLCSO and the pilot ratio PLr is defined by the function F1, but the relationship may be defined by a map.

Figure 11:
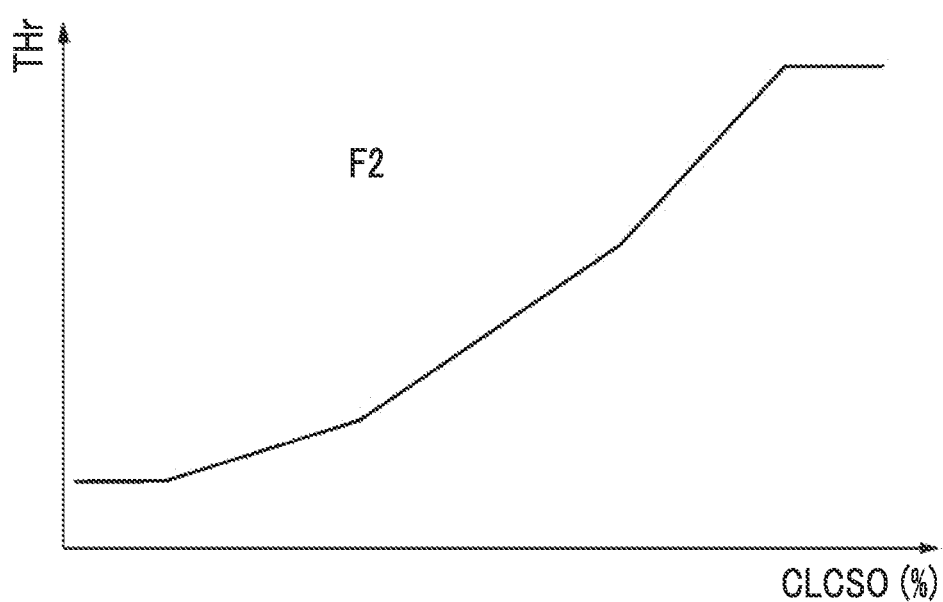
FIG. 11 is a graph for describing a function F2 according to one embodiment of the present disclosure.

The top hat ratio calculator 142 has a function F2 that defines a relationship between the top hat ratio THr and the combustion load command value CLCSO having a positive correlation with the inlet temperature of the combustion gas in the turbine 21. As shown in FIG. 11, the function F2 is a function in which the top hat ratio THr gradually increases as the combustion load command value CLCSO increases, namely, as the inlet temperature of the combustion gas increases. The top hat ratio calculator 142 receives the combustion load command value CLCSO from the combustion load command generator 120. Then, the top hat ratio calculator 142 obtains the top hat ratio THr corresponding to the combustion load command value CLCSO, using the function F2. Here, the relationship between the combustion load command value CLCSO and the top hat ratio THr is defined by the function F2, but the relationship may be defined by a map.

Figure 8:
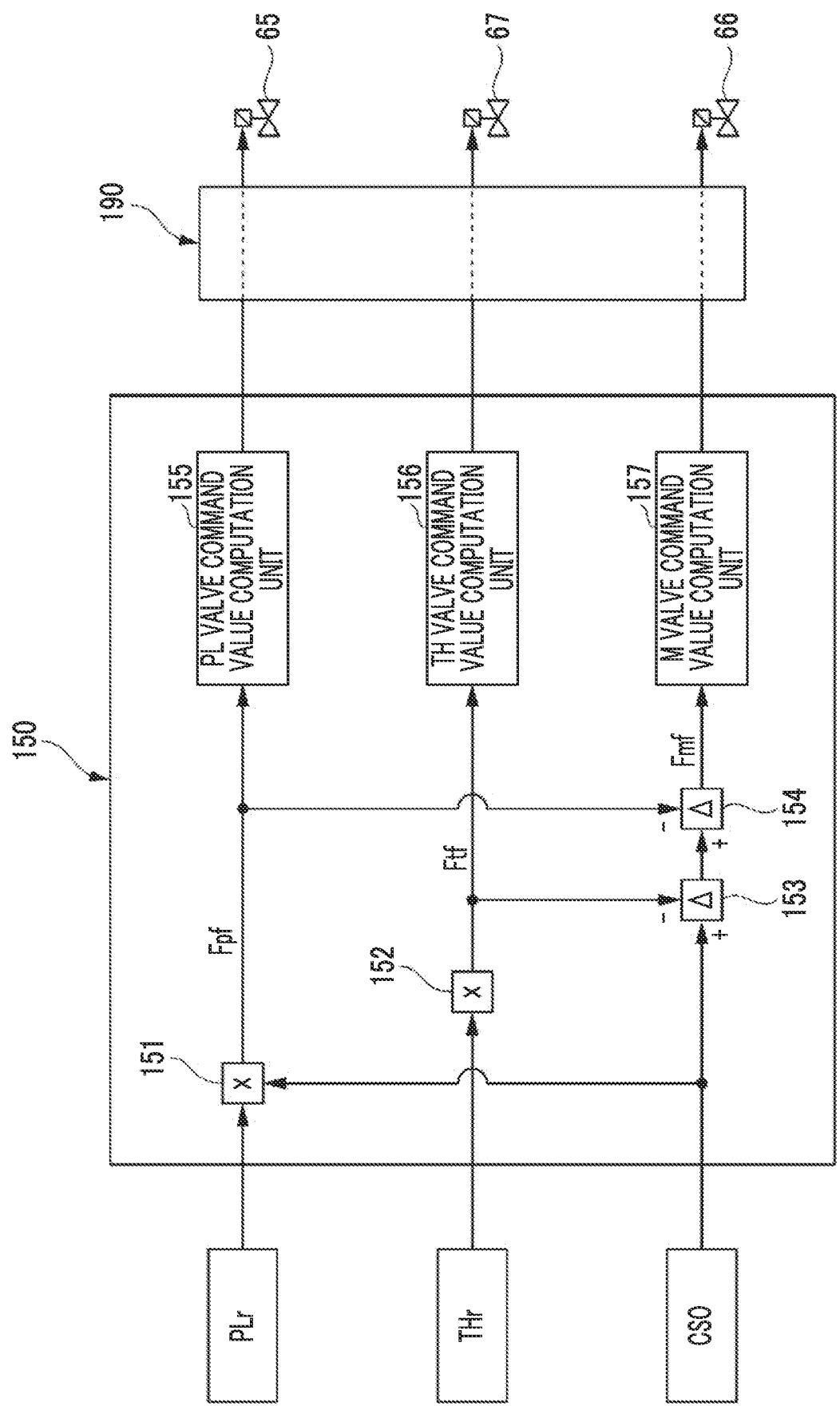
FIG. 8 is a functional block diagram of a valve command value creator according to one embodiment of the present disclosure.

As shown in FIG. 8, the valve command value creator 150 includes a first multiplier 151, a second multiplier 152, a first subtractor 153, a second subtractor 154, a PL valve command value computation unit 155, an M valve command value computation unit 157, and a TH valve command value computation unit 156.

The first multiplier 151 obtains the pilot fuel flow rate Fpf by multiplying the fuel flow rate command value CSO indicating the total fuel flow rate by the pilot ratio PLr. The PL valve command value computation unit 155 obtains a command value for the pilot fuel valve 65 to set the flow rate of the pilot fuel Fp to be sprayed from the pilot nozzle 44, to the pilot fuel flow rate Fpf.

The second multiplier 152 obtains the top hat fuel flow rate Ftf by multiplying the fuel flow rate command value CSO indicating the total fuel flow rate by the top hat ratio THr. The TH valve command value computation unit 156 obtains a command value for the top hat fuel valve 67 to set the flow rate of the top hat fuel Ft to be sprayed from the top hat nozzle 51, to the top hat fuel flow rate Ftf.

The first subtractor 153 subtracts the top hat fuel flow rate Ftf from the fuel flow rate command value CSO indicating the total fuel flow rate. The second subtractor 154 further subtracts the pilot fuel flow rate Fpf from the subtraction result of the first subtractor 153, and outputs the subtraction result to the M valve command value computation unit 157, as a main fuel flow rate Fmf. The M valve command value computation unit 157 obtains a command value for the main fuel valve 66 to set the total flow rate of the main fuel Fm to be sprayed from a plurality of the main nozzles 54, to the main fuel flow rate Fmf.

The control signal output unit 190 outputs a control signal including the command value obtained by the PL valve command value computation unit 155, to the pilot fuel valve 65. The control signal output unit 190 outputs a control signal including the command value obtained by the TH valve command value computation unit 156, to the top hat fuel valve 67. The control signal output unit 190 outputs a control signal including the command value obtained by the M valve command value computation unit 157, to the main fuel valve 66.

Figure 13:
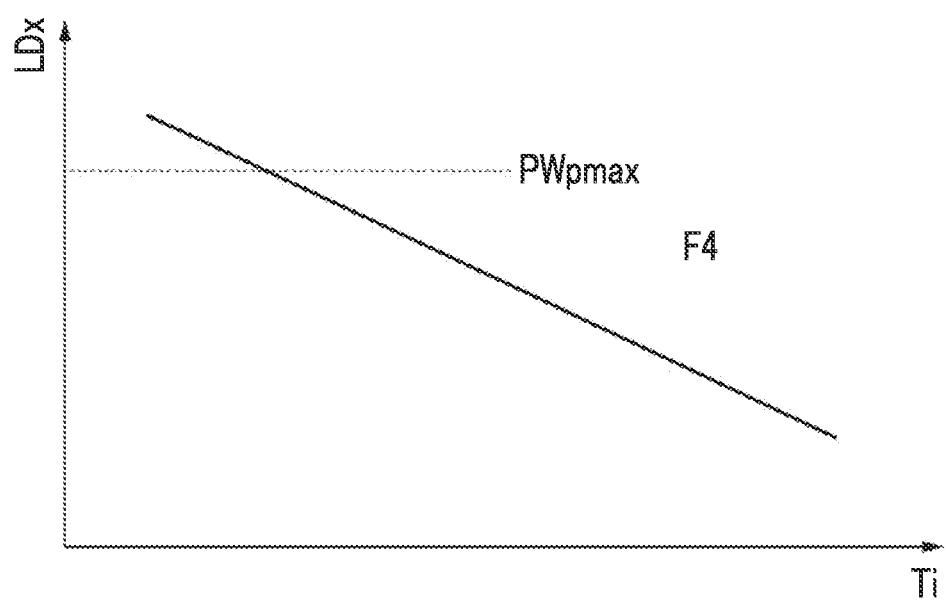
FIG. 13 is a graph for describing a function F4 according to one embodiment of the present disclosure.

As shown in FIG. 1, the intake air temperature Ti from the intake air temperature sensor 73 is input to the limit output creator 170. The limit output creator 170 has a function F4 representing a relationship between a limit output of the gas turbine 10 and the intake air temperature Ti. As shown in FIG. 13, the function F4 is a function in which a limit output LDx gradually decreases as the intake air temperature Ti increases. The limit output creator 170 obtains the limit output LDx corresponding to the intake air temperature Ti, using the function F4.

The limit output LDx is one type of control output of the gas turbine 10. The limit output LDx is corrected to a correction limit output LDxm by the output corrector 180. The correction limit output LDxm is one type of correction control output of the gas turbine 10.

As shown in FIG. 4, the output corrector 180 corrects the measured output PW of the gas turbine 10 from the output meter 72, and outputs the result as the correction output PWm. The measured output PW is one type of control output of the gas turbine 10. In addition, the correction output PWm is one type of correction control output of the gas turbine 10.

Figure 12:
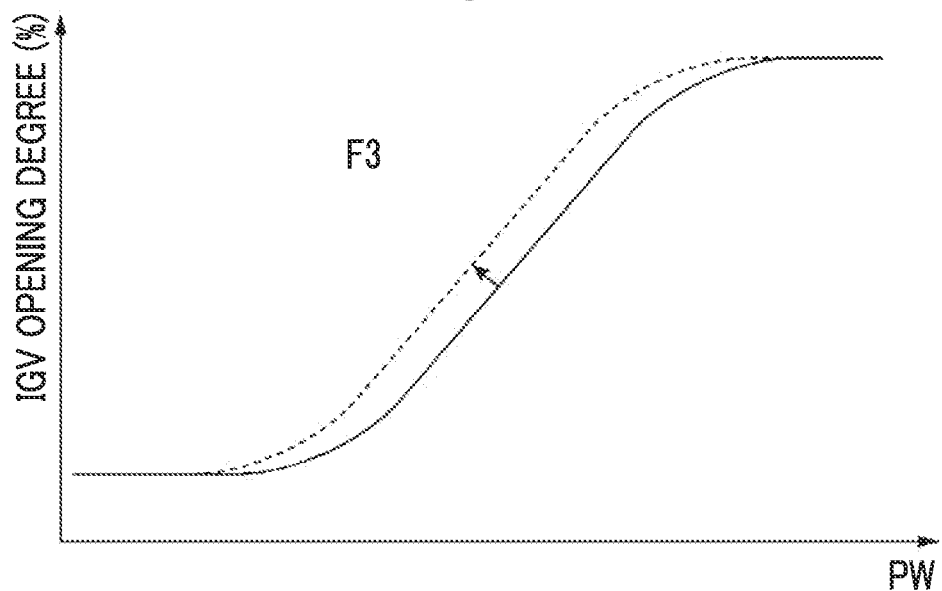
FIG. 12 is a graph for describing a function F3 according to one embodiment of the present disclosure.

The intake air temperature Ti from the intake air temperature sensor 73 and the correction output PWm from the output corrector 180 are input to the IGV command value creator 160. The IGV command value creator 160 has a function F3 representing a relationship between an output of the gas turbine 10 and an IGV opening degree. As shown in FIG. 12, the function F3 is a function in which the IGV opening degree gradually increases as the output of the gas turbine 10 increases. First, the IGV command value creator 160 corrects the correction output PWm with the intake air temperature Ti. Next, the IGV command value creator 160 obtains an IGV opening degree corresponding to the correction output PWm corrected with the intake air temperature Ti, using the function F3. Here, the relationship between the output of the gas turbine 10 and the IGV opening degree is defined by the function F3, but the relationship may be defined by a map.

The IGV command value creator 160 outputs the IGV command value IGVc indicating the IGV opening degree to the combustion load command generator 120 and to the control signal output unit 190. As described above, the combustion load command generator 120 creates the combustion load command value CLCSO using the IGV command value IGVc. In addition, the control signal output unit 190 outputs a control signal including the IGV command value IGVc output by the IGV command value creator 160, to the IGV 14.

Essentially, the function F3 is incorporated into the control device 100 at the initial setting of the control device 100. The function F3 incorporated at the initial setting is a function determined when the gas turbine 10 is designed. After the construction of the gas turbine 10, a trial operation of the gas turbine 10 is performed. In many cases, the function F3 incorporated at the initial setting is changed, for example, as shown by a broken line in FIG. 12, depending on a result during the trial operation.

Figure 9:
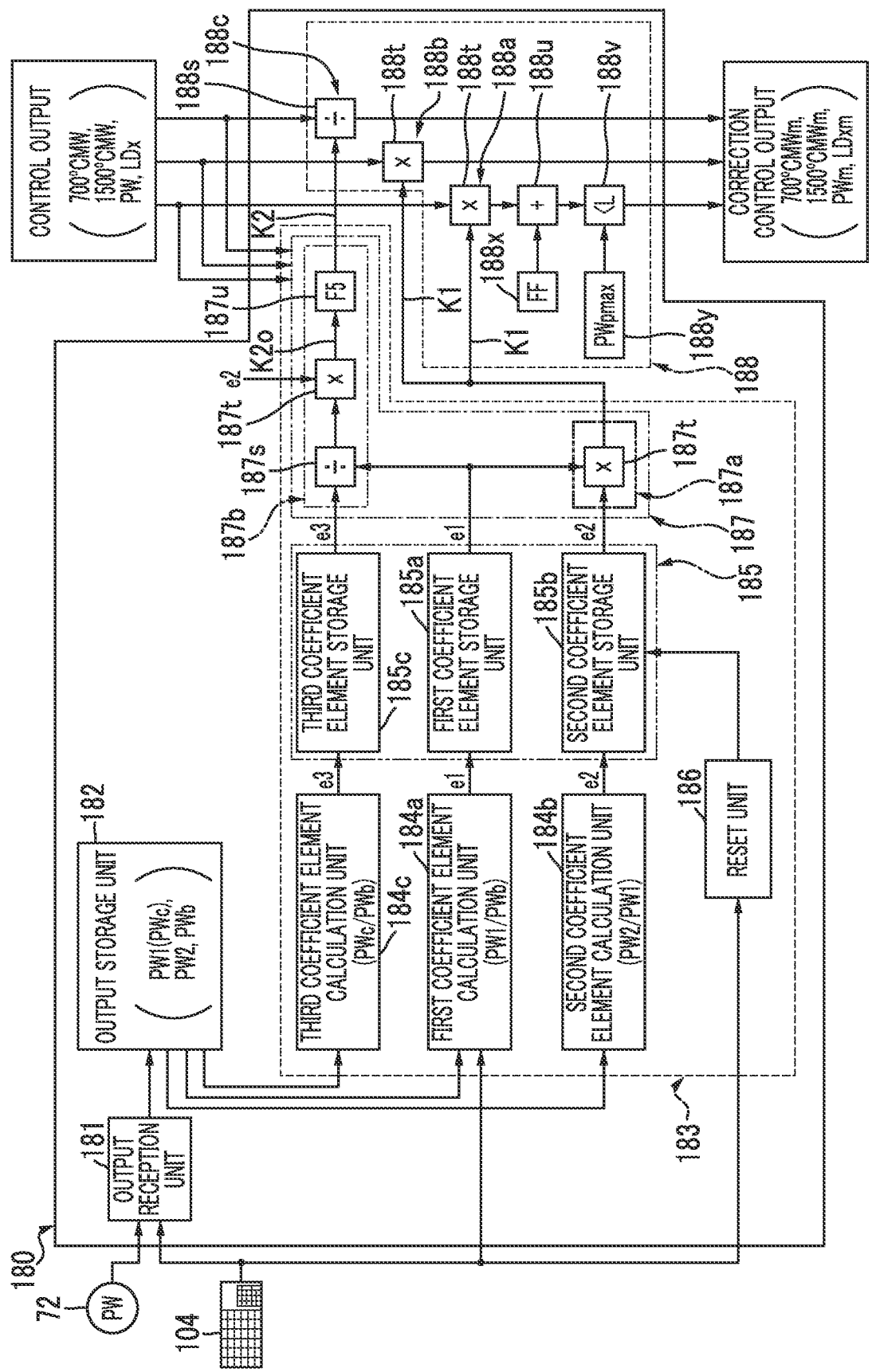
FIG. 9 is a functional block diagram of an output corrector according to one embodiment of the present disclosure.

As shown in FIG. 9, the output corrector 180 corrects a control output, and outputs the result as a correction control output. In the present embodiment, as described above, examples of the control output include the gas turbine output 700° C. MW, the gas turbine output 1500° C. MW, the measured output PW, and the limit output LDx. For this reason, in the present embodiment, examples of the correction control output include the correction 700° C. MWm, the correction 1500° C. MWm, the correction output PWm, and the correction limit output LDxm.

The output corrector 180 includes an output reception unit 181, an output storage unit 182, a correction coefficient creation unit 183, and an output correction unit 188.

The output reception unit 181 receives a reference output PWb, an immediately preceding output PW1, and a current output PW2. The reference output PWb is an output under a condition where the gas turbine 10 can output a maximum output at a reference time in the past. The reference time is, for example, a design time for the gas turbine 10. When the reference output PWb is an output at the design time for the gas turbine 10, for example, the output reception unit 181 receives the reference output PWb from an input device 104 such as a keyboard. The immediately preceding output PW1 is a measured output that the output reception unit 181 receives from the output meter 72 under a condition where the gas turbine 10 can output a maximum output in an immediately preceding time period closer to a current time than to the reference time (design time). The immediately preceding time period includes a trial operation time period during a trial operation of the gas turbine 10 and a main operation time period during a main operation after the trial operation.

For this reason, the immediately preceding time period includes a time period during a construction trial operation that is a trial operation performed after the gas turbine 10 is constructed, and that excludes a trial operation performed after the gas turbine 10 is inspected or repaired. Therefore, examples of the immediately preceding output include a construction output PWc that is an output that the output reception unit 181 receives from the output meter 72 under a condition where the gas turbine 10 can output a maximum output in the time period during the construction trial operation. The current output PW2 is a measured output that the output reception unit 181 receives from the output meter 72 under a condition where the gas turbine 10 can output a maximum output in a current time period between the immediately preceding time period and the current time. The current time period also includes the trial operation time period during the trial operation of the gas turbine 10 and the main operation time period during the main operation after the trial operation.

The output reception unit 181 cannot recognize whether a measured output is the immediately preceding output PW1, the current output PW2, or the construction output PWc, merely by receiving the measured output from the output meter 72 in each time period described above. For this reason, the output reception unit 181 receives a measured output from the output meter 72 from the input device 104 such as a keyboard, and also receives a time period in which the measured output is obtained.

The output storage unit 182 stores the reference output PWb, the immediately preceding output PW1, the current output PW2, and the construction output PWc received from the output reception unit 181.

The correction coefficient creation unit 183 includes a first coefficient element calculation unit 184*a*, a second coefficient element calculation unit 184*b*, a third coefficient element calculation unit 184*c*, a coefficient element storage unit 185, a reset unit 186, and a correction coefficient calculation unit 187.

The first coefficient element calculation unit 184*a* obtains a first coefficient element e1. The first coefficient element e1 is a value obtained by dividing the immediately preceding output PW1 stored in the output storage unit 182 by the reference output PWb stored in the output storage unit 182, namely, a ratio of the immediately preceding output PW1 to the reference output PWb (PW1/PWb). Therefore, the first coefficient element e1 represents the degree of degradation of the output during a period between the reference time and the immediately preceding time period.

When the first coefficient element calculation unit 184*a* receives a reset instruction from the input device 104 such as a keyboard or the like, the first coefficient element calculation unit 184*a* sets a value obtained by dividing the current output PW2 stored in the output storage unit 182 by the reference output PWb stored in the output storage unit 182, namely, a ratio of the current output PW2 to the reference output PWb (PW2/PWb), as the first coefficient element e1. The reset instruction is sent to the first coefficient element calculation unit 184*a* during a period between when the gas turbine 10 is completely stopped and immediately before a trial operation is started.

The second coefficient element calculation unit 184*b* obtains a second coefficient element e2. The second coefficient element e2 is a value obtained by dividing the current output PW2 stored in the output storage unit 182 by the immediately preceding output PW1 stored in the output storage unit 182, namely, a ratio of the current output PW2 to the immediately preceding output PW1 (PW2/PW1).

Therefore, the second coefficient element e2 represents the degree of degradation of the output during a period between the immediately preceding time period and the current time period.

The third coefficient element calculation unit 184*c* obtains a third coefficient element e3. The third coefficient element e3 is a value obtained by dividing the construction output PWc stored in the output storage unit 182 by the reference output PWb stored in the output storage unit 182, namely, a ratio of the construction output PWc to the reference output PWb (PWc/PWb).

Therefore, the third coefficient element e3 represents the degree of degradation of the output during a period between the reference time and the time period during the construction trial operation.

The coefficient element storage unit 185 includes a first coefficient element storage unit 185*a* that stores the first coefficient element e1, a second coefficient element storage unit 185*b* that stores the second coefficient element e2, and a third coefficient element storage unit 185*c* that stores the third coefficient element e3.

The above-described reset instruction is input to the reset unit 186 from the input device 104 such as a keyboard during the period between when the gas turbine 10 is completely stopped and immediately before a trial operation is started. The reset unit 186 receives the reset instruction, and resets the second coefficient element e2 stored in the second coefficient element storage unit 185*b*, to a value that does not affect a calculation result of a correction coefficient by the correction coefficient calculation unit 187, here, to "1".

The correction coefficient calculation unit 187 includes a first correction coefficient calculation unit 187*a* that calculates a first correction coefficient K1, and a second correction coefficient calculation unit 187*b* that calculates a second correction coefficient K2. The first correction coefficient K1 is a correction coefficient for correcting the limit output LDx that is one type of control output, and 1500° C. MW and 700° C. MW that are one type of control output. The second correction coefficient K2 is a correction coefficient for correcting the measured output PW that is one type of control output.

The first correction coefficient calculation unit 187*a* has a multiplier 187*t*. The multiplier 187*t* multiplies the first coefficient element e1 stored in the first coefficient element storage unit 185*a* by the second coefficient element e2 stored in the second coefficient element storage unit 185*b*, and outputs a value of the multiplication result as the first correction coefficient K1.

Figure 14:
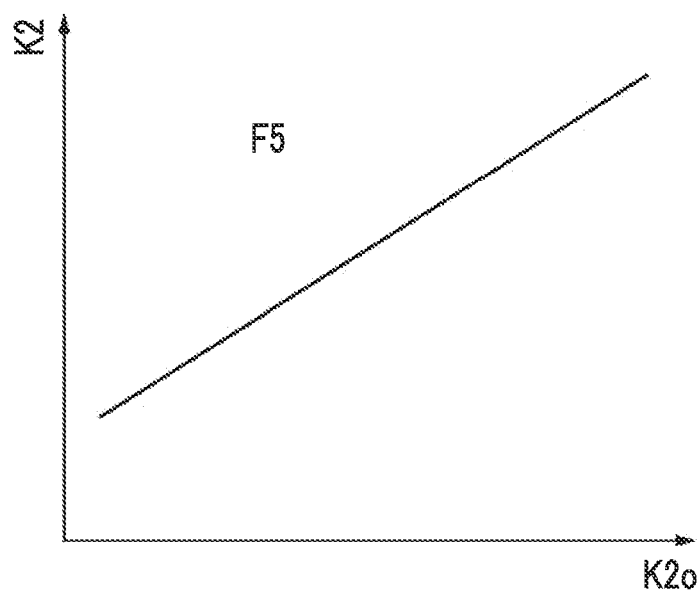
FIG. 14 is a graph for describing a function F5 according to one embodiment of the present disclosure.

The second correction coefficient calculation unit 187*b* includes a divider 187*s*, the multiplier 187*t*, and a correction coefficient adjustor 187*u*. The divider 187*s* divides the first coefficient element e1 stored in the first coefficient element storage unit 185*a* by the third coefficient element e3 stored in the third coefficient element storage unit 185*c*. The multiplier 187*t* multiplies a value of the division result by the divider 187*s*, by the second coefficient element e2 stored in the second coefficient element storage unit 185*b*. A value of the multiplication result by the multiplier 187*t* is a second correction coefficient K2*o* before adjustment. The correction coefficient adjustor 187*u* has a function F5 representing a relationship between the second correction coefficient K2*o* before adjustment and the second correction coefficient K2 after adjustment. As shown in FIG. 14, the function F5 is a function in which the second correction coefficient K2 after adjustment increases as the second correction coefficient K2*o* before adjustment increases. The correction coefficient adjustor 187u obtains the second correction coefficient K2 after adjustment corresponding to the second correction coefficient K2o before adjustment, using the function F5. Here, the relationship between the second correction coefficient K2o before adjustment and the second correction coefficient K2 after adjustment is defined by the function F5, but the relationship may be defined by a map.

The second correction coefficient calculation unit 187b obtains the second correction coefficient K2o before adjustment via computation represented by the following equation.

$$K2o = e1 + e3 \times e2 = (PW1/PWb) + (PWc/PWb) \times (PW2/PW1)$$

In the computation represented by the above equation, the reference output PWb used in the computation of the first coefficient element e1 and the reference output PWb used in the computation of the third coefficient element e3 cancel each other out. For this reason, the second correction coefficients K2o and K2 include no element of the reference output PWb at the design time, but indicate the degree of degradation of the output until the current time period, with respect to the construction output PWc that is a measured output during the construction trial operation.

As described above, the second correction coefficient K2 is used to correct the measured output PW in order to obtain the correction output PWm. In addition, the IGV command value creator 160 obtains an IGV opening degree corresponding to the correction output PWm, using the function F3. In many cases, as described with reference to FIG. 12, the function F3 is changed during the construction trial operation. For this reason, the second correction coefficient K2 used to obtain the IGV opening degree is set to a value indicating the degree of degradation of the output until the current time period, with respect to the construction output PWc that is a measured output during the construction trial operation.

A control output is input not only to the output correction unit 188 but also to the correction coefficient calculation unit 187. The correction coefficient calculation unit 187 outputs a correction coefficient corresponding to the control output out of the first correction coefficient K1 and the second correction coefficient K2, to the output correction unit 188 depending on the control output.

The output correction unit 188 includes a first output correction unit 188a that corrects the limit output LDx using the first correction coefficient K1; a second output correction unit 188b that corrects 1500° C. MW and 700° C. MW using the first correction coefficient K1; and a third output correction unit 188c that corrects the measured output PW using the second correction coefficient K2.

The first output correction unit 188a includes a multiplier 188t; an adder 188u; a low value selector 188v; a first storage unit 188x that stores an amplitude output FF that is an output of the amplitude of the frequency in a system electrically connected to the generator 29; and a second storage unit 188y that stores an allowable maximum output PWpmax of the generator 29. The multiplier 188t multiplies the limit output LDx that is one type of control output, by the first correction coefficient K1. The adder 188u adds the amplitude output FF stored in the first storage unit 188x, to a value of the multiplication result by the multiplier 188t. The low value selector 188v outputs the smaller one of a value of the addition result by the adder 188u and the allowable maximum output PWpmax stored in the second storage unit 188y, as the correction limit output LDxm. As shown in FIG. 13, the allowable maximum output PWpmax is a value that does not change even when the intake air temperature Ti changes. In addition, the allowable maximum output PWpmax is a value smaller than a maximum output PWx for control in a low temperature range when the intake air temperature Ti is within a low temperature range, and is a value larger than the maximum output PWx for control in the other temperature range when the intake air temperature Ti is within the other temperature range.

The second output correction unit 188b includes the multiplier 188t. The multiplier 188t corrects 1500° C. MW and 700° C. MW by multiplying each of 1500° C. MW and 700° C. MW that are one type of control output, by the first correction coefficient K1, and outputs the correction results as the correction 1500° C. MWm and the correction 700° C. MWm.

The third output correction unit 188c includes a divider 188s. The divider 188s corrects the measured output PW by dividing the measured output PW that is one type of control output, by the second correction coefficient K2, and outputs the correction result as the correction output PWm.

Figure 15:
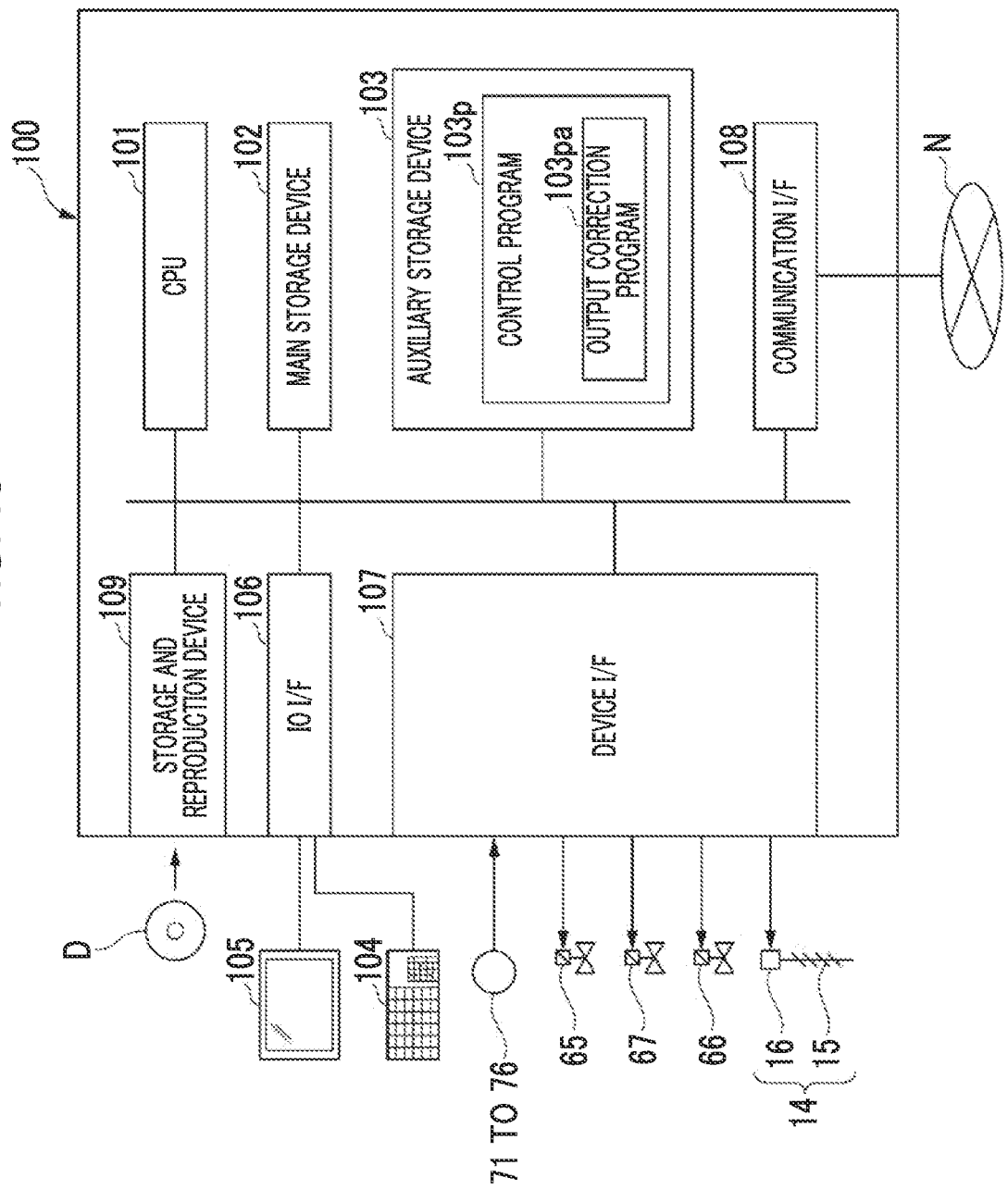
FIG. 15 is a description diagram showing a hardware configuration of the control device according to one embodiment of the present disclosure.

The control device 100 described above is a computer. In terms of hardware, as shown in FIG. 15, the control device 100 includes a central processing unit (CPU) 101 that performs various computations; a main storage device 102 such as a memory serving as a work area of the CPU 101; an auxiliary storage device 103 such as a hard disk drive device; the input device 104 such as a keyboard or a mouse; a display device 105; an input/output interface 106 of the input device 104 and the display device 105; a device interface 107; a communication interface 108 for communicating with the outside via a network N; and a storage and reproduction device 109 that performs storage processing or reproduction processing of data on a disk-type storage medium D.

Each of the detectors 71 to 76, each of the fuel valves 65 to 67, and the IGV 14 described above are connected to the device interface 107 via signal lines or the like.

A control program 103p and the like are stored in the auxiliary storage device 103 in advance. An output correction program 103pa is incorporated in the control program 103p. For example, the control program 103p is taken into the auxiliary storage device 103 from the disk-type storage medium D via the storage and reproduction device 109. The control program 103p may be incorporated into the auxiliary storage device 103 from an external device via the communication interface 108.

All the functional elements of the control device 100 described with reference to FIGS. 4 to 9 function when the CPU 101 executes the control program 103p stored in the auxiliary storage device 103. Particularly, among the functional elements of the control device 100, the output corrector 180 functions when the CPU 101 executes the output correction program 103pa in the control program 103p stored in the auxiliary storage device 103. In addition, each storage unit of the control device 100 is formed of at least one storage device of the main storage device 102 and the auxiliary storage device 103.

Next, an operation sequence of the output corrector 180 described above will be described with reference to flowcharts shown in FIGS. 16 and 17.

Figure 16:
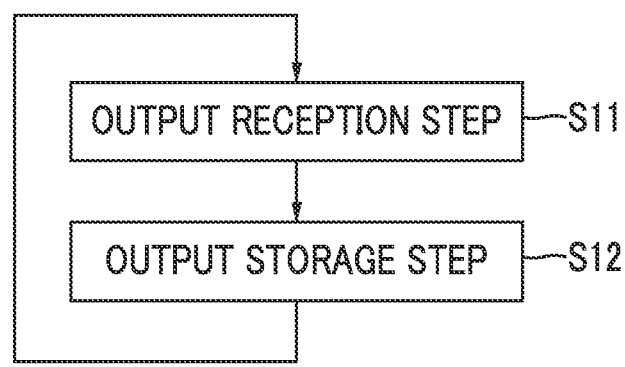
FIG. 16 is a flowchart showing an output reception routine according to one embodiment of the present disclosure.

The flowchart shown in FIG. 16 is a flowchart of an output reception routine. In the output reception routine, the output reception unit 181 receives an output from the input device 104 such as a keyboard or from the output meter 72 (output reception step S11). The output storage unit 182 stores the output (output storage step S12). In the output reception routine, the reference output PWb, the construction output PWc, the immediately preceding output PW1 (excluding the construction output PWc), and the current output PW2 are stored in the output storage unit 182 by repeatedly executing the output reception step S11 and the output storage step S12. Once the reference output PWb and the construction output PWc are stored in the output storage unit 182, the reference output PWb and the construction output PWc are not updated thereafter. On the other hand, once the immediately preceding output PW1 (excluding the construction output PWc) and the current output PW2 are stored in the output storage unit 182, the immediately preceding output PW1 and the current output PW2 are sequentially updated.

Figure 17:
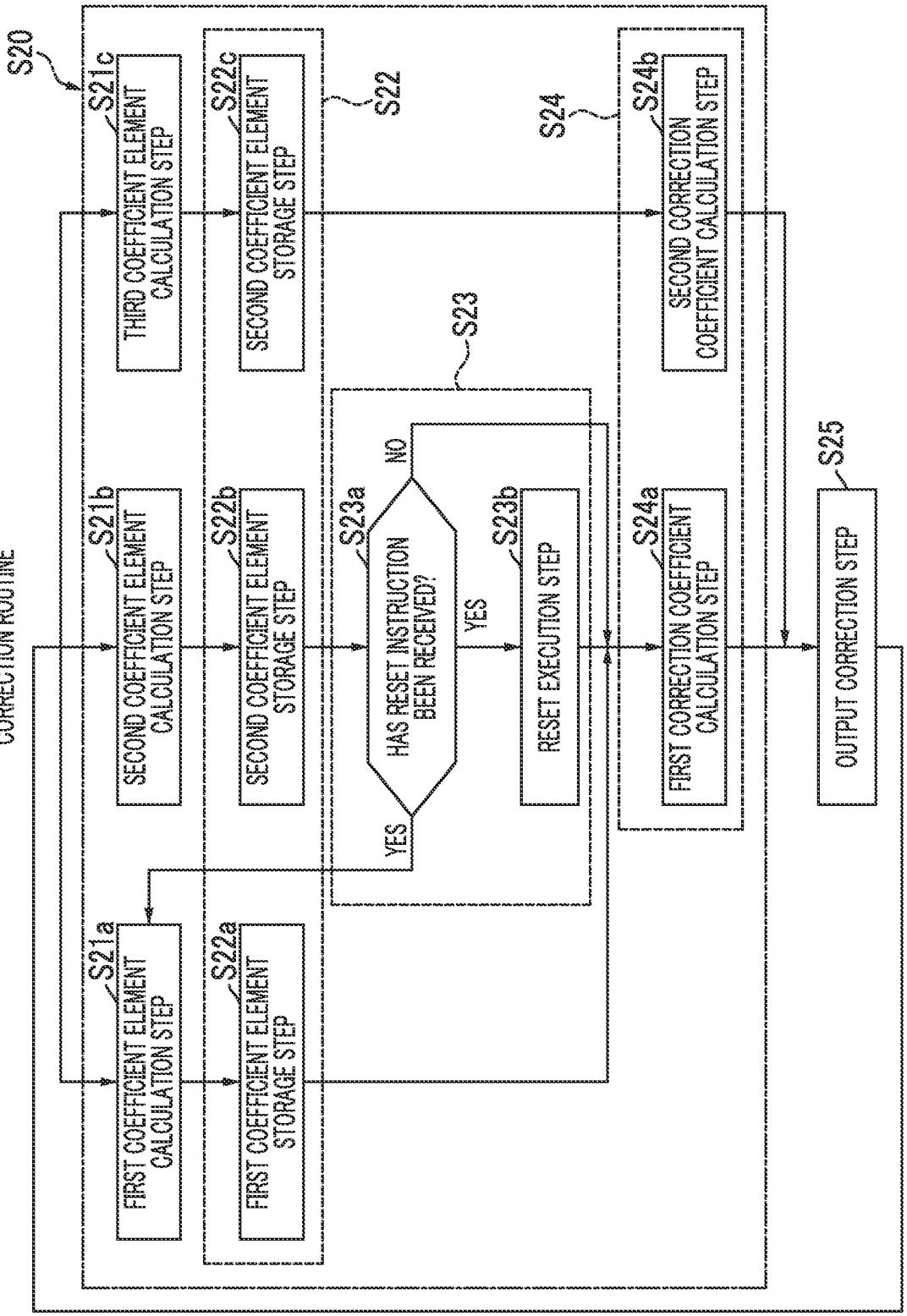
FIG. 17 is a flowchart showing a correction routine according to one embodiment of the present disclosure.

The flowchart shown in FIG. 17 is a flowchart of a correction routine. In the correction routine, a correction coefficient creation step S20 and an output correction step S25 are repeatedly executed.

The correction coefficient creation step S20 includes a first coefficient element calculation step S21a, a second coefficient element calculation step S21b, a third coefficient element calculation step S21c, a coefficient element storage step S22, a reset step S23, and a correction coefficient calculation step S24.

In the first coefficient element calculation step S21a, the first coefficient element calculation unit 184a obtains the first coefficient element e1 by dividing the immediately preceding output PW1 stored in the output storage unit 182 by the reference output PWb stored in the output storage unit 182 (=PW1/PWb). However, when the first coefficient element calculation unit 184a receives a reset instruction from the input device 104 such as a keyboard or the like, the first coefficient element calculation unit 184a obtains the first coefficient element e1 by dividing the current output PW2 stored in the output storage unit 182 by the reference output PWb stored in the output storage unit 182 (=PW2/PWb).

In the second coefficient element calculation step S21b, the second coefficient element calculation unit 184b obtains the second coefficient element e2 by dividing the current output PW2 stored in the output storage unit 182 by the immediately preceding output PW1 stored in the output storage unit 182 (=PW2/PW1).

In the third coefficient element calculation step S21c, the third coefficient element calculation unit 184c obtains the third coefficient element e3 by dividing the construction output PWc stored in the output storage unit 182 by the reference output PWb stored in the output storage unit 182 (=PWc/PWb).

Essentially, the coefficient element calculation steps S21a, S21b, and S21c are not executed at the same time. The coefficient element calculation steps S21a, S21b, and S21c are executed each time the outputs to be used in the coefficient element calculation steps S21a, S21b, and S21c are stored in the output storage unit 182.

The coefficient element storage step S22 includes a first coefficient element storage step S22a, a second coefficient element storage step S22b, and a third coefficient element storage step S22c.

In the first coefficient element storage step S22a, the first coefficient element storage unit 185a stores the first coefficient element e1 calculated in the first coefficient element calculation step S21a.

In the second coefficient element storage step S22b, the second coefficient element storage unit 185b stores the second coefficient element e2 calculated in the second coefficient element calculation step S21b.

In the third coefficient element storage step S22c, the third coefficient element storage unit 185c stores the third coefficient element e3 calculated in the third coefficient element calculation step S21c.

The reset step S23 includes a reception determination step S23a and a reset execution step S23b. In the reception determination step S23a, it is determined whether or not the reset unit 186 has received a reset instruction from the input device 104 such as a keyboard. When it is determined that the reset unit 186 has received the reset instruction, the reset execution step S23b is executed. In the reset execution step S23b, the reset unit 186 resets the second coefficient element e2 stored in the second coefficient element storage unit 185b, to a value that does not affect a calculation result of a correction coefficient by the correction coefficient calculation unit 187, here, to "1". The first coefficient element calculation unit 184a receives the reset instruction at the time when the reset unit 186 receives the reset instruction. As a result, as described above, the first coefficient element calculation unit 184a sets the value obtained by dividing the current output PW2 by the reference output PWb, as the first coefficient element e1 (=PW2/PWb). The first coefficient element e1 is stored in the first coefficient element storage unit 185a.

The correction coefficient calculation step S24 includes a first correction coefficient calculation step S24a and a second correction coefficient calculation step S24b.

In the first correction coefficient calculation step S24a, the first correction coefficient calculation unit 187a calculates the first correction coefficient K1. In the second correction coefficient calculation step S24b, the second correction coefficient calculation unit 187b calculates the second correction coefficient K2.

In the output correction step S25, the output correction unit 188 corrects a control output using a correction coefficient, and outputs the correction result as a correction control output. At this time, the output correction unit 188 corrects a control output with a correction coefficient corresponding to the control output of a correction target among a plurality of the correction coefficients obtained by the correction coefficient calculation unit 187. Specifically, in the output correction step S25, as described above, the first output correction unit 188a of the output correction unit 188 corrects the limit output LDx using the first correction coefficient K1, the amplitude output FF stored in the first storage unit 188x, and the allowable maximum output PWpmax stored in the second storage unit 188y, and outputs the correction result as the correction limit output LDxm. In addition, in the output correction step S25, as described above, the second output correction unit 188b of the output correction unit 188 corrects each of 1500° C. MW and 700° C. MW using the first correction coefficient K1, and outputs the correction results as the correction 1500° C. MWm and the correction 700° C. MWm. In addition, in the output correction step S25, the third output correction unit 188c of the output correction unit 188 corrects the measured output PW using the second correction coefficient K2, and outputs the correction result as the correction output PWm.

Next, changes in each coefficient element, each correction coefficient, and each correction control output over time will be described with reference to FIG. 18.

Here, it is assumed that a reference output PWb at the reference time (planning time) is 100 MW.

It is assumed that the construction output PWc, which is a measured output that the output reception unit 181 receives from the output meter 72 under a condition where the gas turbine 10 can output a maximum output during a construction trial operation, is 90 MW.

It is assumed that a measured output that the output reception unit 181 receives from the output meter 72 under a condition where the gas turbine 10 can output a maximum output during a first main operation thereafter is 80 MW.

It is assumed that a measured output that the output reception unit 181 receives from the output meter 72 under a condition where the gas turbine 10 can output a maximum output during a second main operation thereafter is 70 MW.

It is assumed that the gas turbine 10 has undergone a periodic inspection after the second main operation.

It is assumed that a measured output that the output reception unit 181 receives from the output meter 72 under a condition where the gas turbine 10 can output a maximum output during a trial operation after the periodic inspection is 80 MW. Therefore, here, as a result of the periodic inspection, the measured output (80 MW) is larger than the measured output (70 MW) during the second main operation before the periodic inspection.

It is assumed that a measured output that the output reception unit 181 receives from the output meter 72 under a condition where the gas turbine 10 can output a maximum output during a first main operation thereafter is 70 MW.

It is assumed that a measured output that the output reception unit 181 receives from the output meter 72 under a condition where the gas turbine 10 can output a maximum output during a second main operation thereafter is 65 MW.

Before the start of the construction trial operation, the correction coefficient creation unit 183 receives a reset instruction. For this reason, during the construction trial operation, the first coefficient element calculation unit 184a sets a value obtained by dividing the current output PW2 by the reference output PWb, as the first coefficient element e1 (=PW2/PWb). For this reason, the first coefficient element e1 becomes 9/10 (=90/100), and the first coefficient element e1 is stored in the first coefficient element storage unit 185a. In addition, during the construction trial operation, "1" is stored in the second coefficient element storage unit 185b as the second coefficient element e2 by the operation of the reset unit 186. In addition, during the construction trial operation, the third coefficient element calculation unit 184c sets a value obtained by dividing the construction output PWc by the reference output PWb, as the third coefficient element e3 (=PWc/PWb). For this reason, the third coefficient element e3 becomes 9/10 (=90/100), and the third coefficient element e3 is stored in the third coefficient element storage unit 185c.

The third coefficient element e3 stored in the third coefficient element storage unit 185c is not updated thereafter.

As described above, as a result of determining each coefficient element during the construction trial operation, each correction coefficient during the construction trial operation is obtained. During the construction trial operation, for example, the first correction coefficient K1 (e1×e2) becomes 0.9 (=9/10×1). In addition, the second correction coefficient K2 (e1×e2÷e3) becomes 1.0 (=9/10×1÷9/10). For the sake of simplicity, values of the second correction coefficient K2 and of the second correction coefficient K2 to be described below are set to values where the coefficients are not adjusted by the correction coefficient adjustor 187u.

For this reason, during the construction trial operation, when 1500° C. MW that is one type of control output is 100 MW, the correction 1500° C. MWm obtained using the first correction coefficient K1 becomes 90 MW (=100×0.9). In addition, when the measured output PW that is one type of control output is 90 MW, the correction output PWm obtained using the second correction coefficient K2 becomes 90 MW (90÷1.0).

During the first main operation after the construction trial operation, unlike during the construction trial operation, the first coefficient element calculation unit 184a sets a value obtained by dividing the immediately preceding output PW1 by the reference output PWb, as the first coefficient element e1 (=PW2/PWb). For this reason, the first coefficient element e1 becomes 9/10 (=90/100), and the first coefficient element e1 is stored in the first coefficient element storage unit 185a. During the first main operation, the second coefficient element calculation unit 184b sets a value obtained by dividing the current output PW2 by the immediately preceding output PW1, as the second coefficient element e2 (=PW2/PW1). For this reason, the second coefficient element e2 becomes 8/9 (=80/90), and the second coefficient element e2 is stored in the second coefficient element storage unit 185b. As described above, the third coefficient element e3 stored in the third coefficient element storage unit 185c does not change even when a transition is made from the construction trial operation to the first main operation.

As described above, as a result of determining each coefficient element during the first main operation, each correction coefficient during the first main operation is obtained. During the first main operation, the first correction coefficient K1 (e1×e2) becomes 0.8 (=9/10×8/9). In addition, the second correction coefficient K2 (e1×e2÷e3) becomes 0.89 (=9/10×8/9÷9/10).

For this reason, during the first main operation, when 1500° C. MW that is one type of control output is 100 MW, the correction 1500° C. MWm obtained using the first correction coefficient K1 becomes 80 MW (=100×0.8). In addition, when the measured output PW that is one type of control output is 80 MW, the correction output PWm obtained using the second correction coefficient K2 becomes 90 MW (80÷0.89).

During the second main operation after the first main operation, similarly to the first main operation, the first coefficient element calculation unit 184a and the second coefficient element calculation unit 184b obtain the coefficient elements. For this reason, the first coefficient element e1 (=PW2/PWb) becomes 8/10 (=80/100), and the first coefficient element e1 is stored in the first coefficient element storage unit 185a. In addition, the second coefficient element e2 (=PW2/PW1) becomes 7/8 (=70/80), and the second coefficient element e2 is stored in the second coefficient element storage unit 185b.

As described above, as a result of determining each coefficient element during the second main operation, each correction coefficient during the second main operation is obtained. During the second main operation, the first correction coefficient K1 (e1×e2) becomes 0.7 (=8/10×7/8). In addition, the second correction coefficient K2 (e1×e2÷e3) becomes 0.78 (=8/10×7/8÷9/10).

For this reason, during the second main operation, when 1500° C. MW that is one type of control output is 100 MW, the correction 1500° C. MWm obtained using the first correction coefficient K1 becomes 70 MW (=100×0.7). In addition, when the measured output PW that is one type of control output is 70 MW, the correction output PWm obtained using the second correction coefficient K2 becomes 90 MW (70÷0.78).

When the second main operation ends, as described above, a periodic inspection is performed.

Before the start of a trial operation after the periodic inspection, the correction coefficient creation unit 183 receives a reset instruction. For this reason, during the trial operation after the periodic inspection, the first coefficient element calculation unit 184*a* sets a value obtained by dividing the current output PW2 by the reference output PWb, as the first coefficient element e1 (=PW2/PWb). For this reason, the first coefficient element e1 becomes 8/10 (=80/100), and the first coefficient element e1 is stored in the first coefficient element storage unit 185*a*. In addition, during the trial operation, "1" is stored in the second coefficient element storage unit 185*b* as the second coefficient element e2 by the operation of the reset unit 186.

As described above, as a result of determining each coefficient element during the trial operation, each correction coefficient during the trial operation is obtained. During the trial operation, the first correction coefficient K1 (e1×e2) becomes 0.8 (=80/10×1). In addition, the second correction coefficient K2 (e1×e2÷e3) becomes 0.89 (=8/10×1÷9/10).

For this reason, during the trial operation, when 1500° C. MW that is one type of control output is 100 MW, the correction 1500° C. MWm obtained using the first correction coefficient K1 becomes 80 MW (=100×0.8). In addition, when the measured output PW that is one type of control output is 70 MW, the correction output PWm obtained using the second correction coefficient K2 becomes 79 MW (70÷0.89).

During a first main operation after the preceding trial operation, unlike during the preceding trial operation, the first coefficient element calculation unit 184*a* sets a value obtained by dividing the immediately preceding output PW1 by the reference output PWb, as the first coefficient element e1 (=PW2/PWb). For this reason, the first coefficient element e1 becomes 8/10 (=80/100), and the first coefficient element e1 is stored in the first coefficient element storage unit 185*a*. During the first main operation, the second coefficient element calculation unit 184*b* sets a value obtained by dividing the current output PW2 by the immediately preceding output PW1, as the second coefficient element e2 (=PW2/PW1). For this reason, the second coefficient element e2 becomes 7/8 (=70/80), and the second coefficient element e2 is stored in the second coefficient element storage unit 185*b*.

As described above, as a result of determining each coefficient element during the first main operation, each correction coefficient during the first main operation is obtained. During the first main operation, the first correction coefficient K1 (e1×e2) becomes 0.7 (=8/10×7/8). In addition, the second correction coefficient K2 (e1×e2÷e3) becomes 0.78 (=8/10×7/8÷9/10).

For this reason, during the first main operation, when 1500° C. MW that is one type of control output is 100 MW, the correction 1500° C. MWm obtained using the first correction coefficient K1 becomes 70 MW (=100×0.7). In addition, when the measured output PW that is one type of control output is 70 MW, the correction output PWm obtained using the second correction coefficient K2 becomes 90 MW (70÷0.078).

During the second main operation after the first main operation, similarly to the first main operation, the first coefficient element calculation unit 184*a* and the second coefficient element calculation unit 184*b* obtain the coefficient elements. For this reason, the first coefficient element e1 (=PW2/PWb) becomes 7/10 (=70/100). In addition, the second coefficient element e2 (=PW2/PW1) becomes 6.5/7 (=65/70).

During the second main operation, the first correction coefficient K1 (e1×e2) becomes 0.65 (=7/10×65/70). In addition, the second correction coefficient K2 (e1×e2÷e3) becomes 0.72 (=7/10×65/70÷9/10). In addition, when 1500° C. MW that is one type of control output is 100 MW, the correction 1500° C. MWm obtained using the first correction coefficient K1 becomes 65 MW (=100×0.65). In addition, when the measured output PW that is one type of control output is 65 MW, the correction output PWm obtained using the second correction coefficient K2 becomes 90 MW (65÷0.72).

As described above, the output corrector 180 of the control device 100 corrects the control output based on the degree of degradation of the output caused by a degradation in performance of the gas turbine.

Next, an overall operation of the control device 100 will be described with reference to a flowchart shown in FIG. 19.

The output corrector 180 of the control device 100 corrects control outputs based on the degree of degradation of an output caused by a degradation in performance of the gas turbine (output correction step S31). As a result, in the present embodiment, the correction output PWm, the correction 1500° C. MWm, the correction 700° C. MWm, and the correction limit output LDm are obtained as the correction control outputs.

The command value creation unit 110 of the control device 100 creates a command value for a control target of the gas turbine 10 using the correction control output obtained in the execution of the output correction step S31 (command value creation step S32). The IGV command value creator 160 creates the IGV command value IGVc using the correction output PWm. The combustion load command generator 120 creates the combustion load command CLCSO using the correction 1500° C. MWm and the correction 700° C. MWm. The valve command value creator 150 creates a command value for each of the fuel valves 65, 66, and 67 using the flow rate ratio obtained using the combustion load command CLCSO, and the total fuel flow rate indicated by the fuel flow rate command value CSO, from the fuel flow rate command generator 130. The correction limit output LDm may be, for example, one of candidates selected by the low value selector 135 of the fuel flow rate command generator 130 shown in FIG. 6.

The control signal output unit 190 of the control device 100 outputs a control signal indicating the command value to the control target (control signal output step S33). The control signal output unit 190 creates a control signal for each of a plurality of the fuel valves 65, 66, and 67 based on the command value for each of the plurality of fuel valves 65, 66, and 67 created by the valve command value creator 150, and outputs each control signal to one of the fuel valves 65, 66, and 67. In addition, the control signal output unit 190 creates a control signal based on the IGV command value IGVc created by the IGV command value creator 160, and outputs the control signal to the IGV 14.

As described above, in the present embodiment, correction coefficients are obtained using a plurality of the coefficient elements e1, e2, and e3. The correction coefficient is a value indicating the degree of degradation of the output caused by a degradation in performance of the gas turbine. In addition, each of the plurality of coefficient elements e1, e2, and e3 is also a value indicating the degree of degradation of the output caused by a degradation in performance of the gas turbine. However, the plurality of coefficient elements e1, e2, and e3 indicate the degrees of degradation of the output in different time periods. In the present embodiment, correction coefficients are obtained using the plurality of coefficient elements e1, e2, and e3 that are different from each other, and the control output is corrected with the correction coefficients. Therefore, in the present embodiment, it is possible to obtain a correction control output that appropriately reflects the degree of degradation of the output.

When the first coefficient element calculation unit 184*a* in the present embodiment receives a reset instruction during a period between when the gas turbine 10 is completely stopped and when a trial operation is started, during the trial operation, the first coefficient element calculation unit 184*a* calculates the first coefficient element e1 using the current output PW2 in the current time period instead of using the immediately preceding output PW1 in the immediately preceding time period. In addition, when the reset unit 186 in the present embodiment receives the reset instruction during the period between when the gas turbine 10 is completely stopped and when the trial operation is started, the reset unit 186 resets the second coefficient element e2 stored in the coefficient element storage unit 185, to a value that does not affect a calculation result of a correction coefficient by the correction coefficient calculation unit 187, specifically, to "1".

If a periodic inspection has been performed before a trial operation and the performance of the gas turbine has been improved by the periodic inspection, even when the first coefficient element e1 and the second coefficient element e2 are calculated using the immediately preceding output PW1 in the immediately preceding time period before the trial operation, the first coefficient element e1 and the second coefficient element e2 do not appropriately represent the degree of degradation of the output. For this reason, as described above, when the first coefficient element calculation unit 184*a* in the present embodiment receives a reset instruction, the first coefficient element calculation unit 184*a* calculates the first coefficient element e1 using the current output PW2 in the current time period. Further, when the reset unit 186 in the present embodiment receives the reset instruction, the reset unit 186 resets the second coefficient element e2 stored in the coefficient element storage unit 185, to a value that does not affect a calculation result of a correction coefficient by the correction coefficient calculation unit 187.

Therefore, in the present embodiment, even when the trial operation is started from a state where the gas turbine 10 is completely stopped, it is possible to obtain a correction control output that appropriately reflects the degree of degradation of the output.

As described above, a relationship between the correction output PWm, which is a correction control output that is a correction result of the control output, and the IGV command value IGVc may change during a construction trial operation depending on a result during the construction trial operation. In the present embodiment, in the process of calculating the second correction coefficient K2, the reference output PWb used in the computation of the first coefficient element e1 and the reference output PWb used in the computation of the third coefficient element e3 cancel each other out. For this reason, the second correction coefficient K2 includes no element of the reference output PWb at the design time, and indicates the degree of degradation of the output until the current time period, with respect to the construction output PWc that is a measured output during the construction trial operation.

As described above, in the present embodiment, it is possible to obtain the correction control output that appropriately reflects the degree of degradation of the output according to various situations. For this reason, in the present embodiment, it is possible to suppress the occurrence of a control failure of a control target by creating a command value for the control target using the correction control output, and by outputting a control signal indicating the command value to the control target.

Modification Examples

As shown in FIG. 9, the correction coefficient calculation unit 187 in the above embodiment includes the independent correction coefficient calculation units 187*a* and 187*b* for each of a plurality of the correction coefficients K1 and K2. However, the correction coefficient calculation unit 187 does not need to include the independent correction coefficient calculation units for each of the plurality of correction coefficients K1 and K2. For example, the correction coefficient calculation unit 187 may be configured to include the divider 187*s*, only one multiplier 187*t*, and the correction coefficient adjustor 187*u* among the functional elements of the first correction coefficient calculation unit 187*a* and of the second correction coefficient calculation unit 187*b*. In this case, among the above functional elements, the correction coefficient calculation unit 187 operates only a function required for calculating a correction coefficient required for correcting a certain control output.

In the above embodiment, as examples of the control outputs as correction targets, the measured output PW, 1500° C. MW, 700° C. MW, and the limit output LDx are provided. However, another control output may be used as a control output as a correction target. For example, when a flow rate ratio for each of the plurality of fuel valves 65, 66, and 67 is obtained, a load factor other than the combustion load command CLCSO may be used. The load factor is a value obtained by dividing the measured output by the maximum output allowed by the gas turbine 10. Therefore, the maximum output may be one of the control outputs as correction targets.

In the above embodiment, the measured output PW is provided as an example of the control output corrected using the second correction coefficient K2. However, in a case where a relationship between the correction control output, which is the correction result of the control output, and the command value changes during the construction trial operation, a correction control output may be obtained by correcting a control output other than the measured output PW with the second correction coefficient K2.

[Supplemental Notes]

For example, an output controller 180 for a gas turbine 10 in the above embodiment is understood as follows.

(1) According to a first aspect, there is provided an output corrector for a gas turbine 10 including a compressor 11 that compresses air to generate compressed air, a combustor 31 that combusts fuel in the compressed air to generate combustion gas, and a turbine 21 to be driven by the combustion gas, the corrector including: a correction coefficient creation unit 183 that creates a correction coefficient to be used when a control output of the gas turbine 10 is corrected; an output correction unit 188 that corrects the control output using the correction coefficient, and that outputs a corrected control output as a correction control output; an output reception unit 181 that receives at least an output from an output meter 72 that detects an output of the gas turbine 10; and an output storage unit 182 that stores the output received by the output reception unit 181. The correction coefficient creation unit 183 includes a first coefficient element calculation unit 184*a* that calculates a first coefficient element e1, a second coefficient element calculation unit 184b that calculates a second coefficient element e2, and a correction coefficient calculation unit 187 that calculates the correction coefficient using the first coefficient element e1 and the second coefficient element e2. The output storage unit 182 stores a reference output PWb that is an output under a condition where the gas turbine 10 outputs a maximum output at a reference time in the past, and an immediately preceding output PW1 that the output reception unit 181 receives under a condition where the gas turbine 10 outputs a maximum output in an immediately preceding time period closer to a current time than to the reference time. The first coefficient element e1 is a ratio of the immediately preceding output PW1 stored in the output storage unit 182 to the reference output PWb stored in the output storage unit 182. The second coefficient element e2 is a ratio of a current output PW2 that the output reception unit 181 receives under a condition where the gas turbine 10 outputs a maximum output in a current time period between the immediately preceding time period and the current time, to the immediately preceding output PW1 stored in the output storage unit 182.

In this aspect, the correction coefficient is obtained using the first coefficient element e1 and the second coefficient element e2. The correction coefficient is a value indicating the degree of degradation of the output caused by a degradation in performance of the gas turbine. In addition, the first coefficient element e1 and the second coefficient element e2 are also values indicating the degrees of degradation of the output caused by a degradation in performance of the gas turbine. However, the first coefficient element e1 and the second coefficient element e2 indicate the degrees of degradation of the output in different time periods. Specifically, the first coefficient element e1 indicates a degradation in output from the reference time to the immediately preceding time period, and the second coefficient element e2 indicates a degradation in output from the immediately preceding time period to the current time period. As described above, in this aspect, the correction coefficient is obtained using a plurality of the coefficient elements that are different from each other, and the control output is corrected with the correction coefficient.

Therefore, in this aspect, it is possible to obtain the correction control output that appropriately reflects the degree of degradation of the output.

(2) According to the output corrector for a gas turbine 10 in a second aspect, in the output corrector for a gas turbine 10 according to the first aspect, the first coefficient element calculation unit 184a calculates the first coefficient element e1 using the current output PW2 in the current time period instead of the immediately preceding output PW1 in the immediately preceding time period on a condition that a reset instruction is received. The correction coefficient creation unit 183 further includes a coefficient element storage unit 185 that stores the first coefficient element e1 calculated by the first coefficient element calculation unit 184a, and the second coefficient element e2 calculated by the second coefficient element calculation unit 184b, and a reset unit 186 that resets the second coefficient element e2 stored in the coefficient element storage unit 185, to a value that does not affect a calculation result of the correction coefficient by the correction coefficient calculation unit 187, when the reset instruction is received. The correction coefficient calculation unit 187 calculates the correction coefficient using the second coefficient element e2 and the first coefficient element e1 stored in the coefficient element storage unit 185.

The first coefficient element calculation unit 184a and the reset unit 186 in this aspect receive the reset instruction during a period between when the gas turbine 10 is completely stopped and when a trial operation is started. When the reset instruction is received, during the trial operation, the first coefficient element calculation unit 184a calculates the first coefficient element e1 using the current output PW2 in the current time period instead of using the immediately preceding output PW1 in the immediately preceding time period. In addition, the reset unit 186 resets the second coefficient element e2 stored in the coefficient element storage unit 185, to a value that does not affect a calculation result of the correction coefficient by the correction coefficient calculation unit 187.

If a periodic inspection has been performed before a trial operation and the performance of the gas turbine has been improved by the periodic inspection, even when the first coefficient element e1 and the second coefficient element e2 are calculated using the immediately preceding output PW1 in the immediately preceding time period before the trial operation, the first coefficient element e1 and the second coefficient element e2 do not appropriately represent the degree of degradation of the output. For this reason, when the first coefficient element calculation unit 184a in this aspect receives a reset instruction, the first coefficient element calculation unit 184a calculates the first coefficient element e1 using the current output PW2 in the current time period. Further, when the reset unit 186 in this aspect receives the reset instruction, the reset unit 186 resets the second coefficient element e2 stored in the coefficient element storage unit 185, to a value that does not affect a calculation result of the correction coefficient by the correction coefficient calculation unit 187.

Therefore, in this aspect, even when the trial operation is started from a state where the gas turbine 10 is completely stopped, it is possible to obtain the correction control output that appropriately reflects the degree of degradation of the output.

(3) According to the output corrector for a gas turbine 10 in a third aspect, in the output corrector for a gas turbine 10 according to the first or second aspect, the correction coefficient calculation unit 187 calculates the correction coefficient by multiplying the first coefficient element e1 by the second coefficient element e2.

(4) According to the output corrector for a gas turbine 10 in a fourth aspect, in the output corrector for a gas turbine 10 according to any one of the first to third aspects, the reference time is a design time for the gas turbine 10, and the reference output PWb is a design output under a condition where the gas turbine 10 outputs a maximum output at the design time.

(5) According to the output corrector for a gas turbine 10 in a fifth aspect, in the output corrector for a gas turbine 10 according to the fourth aspect, the immediately preceding time period includes a time period during a construction trial operation that is a trial operation performed after the gas turbine 10 is constructed, and that excludes a trial operation after the gas turbine 10 is inspected or repaired. The immediately preceding output PW1 includes a construction output PWc that is an output that the output reception unit 181 receives under a condition where the gas turbine 10 outputs a maximum output in the time period during the construction trial operation. The correction coefficient creation unit 183 further includes a third coefficient element calculation unit 184c that calculates a third coefficient element e3. The correction coefficient calculation unit 187 calculates the correction coefficient using the first coefficient element e1, the second coefficient element e2, and the third coefficient element e3. The third coefficient element e3 is a ratio of the construction output PWc stored in the output storage unit 182 to the reference output PWb stored in the output storage unit 182.

A relationship between the correction control output, which is the correction result of the control output, and the command value may change during the construction trial operation depending on a result during the construction trial operation. In this aspect, in the process of calculating the correction coefficient, the reference output PWb used in the computation of the first coefficient element e1 and the reference output PWb used in the computation of the third coefficient element e3 cancel each other out. For this reason, the correction coefficient includes no element of the reference output PWb at the design time, and can indicate the degree of degradation of the output until the current time period, with respect to the construction output PWc that is a measured output during the construction trial operation.

(6) According to the output corrector for a gas turbine 10 in a sixth aspect, in the output corrector for a gas turbine 10 according to the fifth aspect, the correction coefficient calculation unit 187 divides a value obtained by multiplying the first coefficient element e1 by the second coefficient element e2, by the third coefficient element e3, and calculates the correction coefficient based on a value obtained after the division, or multiplies a value obtained by dividing the first coefficient element e1 by the third coefficient element e3, by the second coefficient element e2, and calculates the correction coefficient based on a value obtained after the multiplication.

(7) According to the output corrector for a gas turbine 10 in a seventh aspect, in the output corrector for a gas turbine 10 according to any one of the first to sixth aspects, the control output is a measured output PW that the output reception unit 181 receives from the output meter 72 at the current time.

(8) According to the output corrector for a gas turbine 10 in an eighth aspect, in the output corrector for a gas turbine 10 according to any one of the first to sixth aspects, the control output is a limit output LDx determined according to a temperature of the air suctioned by the compressor 11 at the current time.

(9) According to the output corrector 180 for a gas turbine 10 in a ninth aspect, in the output corrector for a gas turbine 10 according to any one of the first to sixth aspects, the control output is an output of the gas turbine 10 when it is assumed that an inlet temperature, which is a temperature of the combustion gas that has reached an inlet of the turbine 21 from the combustor 31, is a predetermined temperature at the current time.

For example, a control device 100 for a gas turbine 10 in the above embodiment is understood as follows.

(10) According to a tenth aspect, there is provided a control device for a gas turbine 10, the device including: the output corrector 180 for the gas turbine 10 according to any one of the first to ninth aspects; a command value creation unit 110 that creates a command value for a control target of the gas turbine 10 using the correction control output obtained by the output corrector 180; and a control signal output unit 190 that outputs a control signal indicating the command value to the control target.

As described above, the output corrector of this aspect can obtain the correction control output that appropriately reflects the degree of degradation of the output. For this reason, it is possible to suppress the occurrence of a control failure of the control target by creating the command value for the control target using the correction control output, and by outputting the control signal indicating the command value to the control target.

For example, an output correction method for a gas turbine 10 in the above embodiment is understood as follows.

(11) According to an eleventh aspect, there is provided an output correction method for a gas turbine 10 including a compressor 11 that compresses air to generate compressed air, a combustor 31 that combusts fuel in the compressed air to generate combustion gas, and a turbine 21 to be driven by the combustion gas, the method including: executing a correction coefficient creation step S20 of creating a correction coefficient to be used when a control output of the gas turbine 10 is corrected; executing an output correction step S25 of correcting the control output using the correction coefficient, and outputting a corrected control output as a correction control output; executing an output reception step S11 of receiving at least an output from an output meter 72 that detects an output of the gas turbine 10; and executing an output storage step S12 of storing the output received in the output reception step S11. The correction coefficient creation step S20 includes a first coefficient element calculation step S21a of calculating a first coefficient element e1, a second coefficient element calculation step S21b of calculating a second coefficient element e2, and a correction coefficient calculation step S24 of calculating the correction coefficient using the first coefficient element e1 and the second coefficient element e2. In the output storage step S12, a reference output PWb that is an output under a condition where the gas turbine 10 outputs a maximum output at a reference time in the past, and an immediately preceding output PW1 received in the output reception unit 181 under a condition where the gas turbine 10 outputs a maximum output in an immediately preceding time period closer to a current time than to the reference time are stored. The first coefficient element e1 is a ratio of the immediately preceding output PW1 stored in the output storage step S12 to the reference output PWb stored in the output storage step S12. The second coefficient element e2 is a ratio of a current output PW2 received in the output reception step S11 under a condition where the gas turbine 10 outputs a maximum output in a current time period between the immediately preceding time period and the current time, to the immediately preceding output PW1 stored in the output storage step S12.

In this aspect, similarly to the output corrector in the first aspect, it is possible to obtain the correction control output that appropriately reflects the degree of degradation of the output.

(12) According to the output correction method for a gas turbine 10 in a twelfth aspect, in the output correction method for a gas turbine 10 according to the eleventh aspect, in the first coefficient element calculation step S21a, the first coefficient element e1 is calculated using the current output PW2 in the current time period instead of the immediately preceding output PW1 in the immediately preceding time period on a condition that a reset instruction is received. The correction coefficient creation step S20 further includes a coefficient element storage step S22 of storing the first coefficient element e1 calculated in the first coefficient element calculation step S21a, and the second coefficient element e2 calculated in the second coefficient element calculation step S21b, and a reset step S23 of resetting the second coefficient element e2 stored in the coefficient element storage step S22, to a value that does not affect a calculation result of the correction coefficient in the correction coefficient calculation step S24, when the reset instruction is received. In the correction coefficient calculation step S24, the correction coefficient is calculated using the second coefficient element e2 and the first coefficient element e1 stored in the coefficient element storage step S22.

In this aspect, similarly to the output corrector in the second aspect, even when a trial operation is started from a state where the gas turbine 10 is completely stopped, it is possible to obtain the correction control output that appropriately reflects the degree of degradation of the output.

(13) According to the output correction method for a gas turbine 10 in a thirteenth aspect, in the output correction method for a gas turbine 10 according to the eleventh or twelfth aspect, the reference time is a design time for the gas turbine 10, and the reference output PWb is a design output under a condition where the gas turbine 10 outputs a maximum output at the design time.

(14) According to the output correction method for a gas turbine 10 in a fourteenth aspect, in the output correction method for a gas turbine 10 according to the thirteenth aspect, the immediately preceding time period includes a time period during a construction trial operation that is a trial operation performed after the gas turbine 10 is constructed, and that excludes a trial operation after the gas turbine 10 is inspected or repaired. The immediately preceding output PW1 includes a construction output PWc that is an output received in the output reception step S11 under a condition where the gas turbine 10 outputs a maximum output in the time period during the construction trial operation. The correction coefficient creation step S20 further includes a third coefficient element calculation step S21c of calculating a third coefficient element e3. In the correction coefficient calculation step S24, the correction coefficient is calculated using the first coefficient element e1, the second coefficient element e2, and the third coefficient element e3. The third coefficient element e3 is a ratio of the construction output PWc stored in the output storage step S12 to the reference output PWb stored in the output storage step S12.

In this aspect, similarly to the output corrector in the fifth aspect, it is possible to indicate the degree of degradation of the output until the current time period, with respect to the construction output PWc that is a measured output during the construction trial operation.

For example, a control method for a gas turbine 10 in the above embodiment is understood as follows.

(15) According to a fifteenth aspect, there is provided a control method for a gas turbine 10, the method including: executing the output correction method for the gas turbine 10 according to any one of the eleventh to fourteenth aspects; executing a command value creation step S32 of creating a command value for a control target of the gas turbine 10 using the correction control output obtained by the output correction method; and executing a control signal output step S33 of outputting a control signal indicating the command value to the control target.

In this aspect, similarly to the control device in the twelfth aspect, it is possible to suppress the occurrence of a control failure of the control target.

For example, an output correction program 103pa for a gas turbine 10 in the above embodiment is understood as follows.

(16) According to a sixteenth aspect, there is provided an output correction program for a gas turbine 10 including a compressor 11 that compresses air to generate compressed air, a combustor 31 that combusts fuel in the compressed air to generate combustion gas, and a turbine 21 to be driven by the combustion gas, the program causing a computer to execute: a correction coefficient creation step S20 of creating a correction coefficient to be used when a control output of the gas turbine 10 is corrected; an output correction step S25 of correcting the control output using the correction coefficient, and outputting a corrected control output as a correction control output; an output reception step S11 of receiving at least an output from an output meter 72 that detects an output of the gas turbine 10; and an output storage step S12 of storing the output received in the output reception step S11, in a storage device of the computer. The correction coefficient creation step S20 includes a first coefficient element calculation step S21a of calculating a first coefficient element e1, a second coefficient element calculation step S21b of calculating a second coefficient element e2, and a correction coefficient calculation step S24 of calculating the correction coefficient using the first coefficient element e1 and the second coefficient element e2. In the output storage step S12, a reference output PWb that is an output under a condition where the gas turbine 10 outputs a maximum output at a reference time in the past, and an immediately preceding output PW1 received in the output reception step S11 under a condition where the gas turbine 10 outputs a maximum output in an immediately preceding time period closer to a current time than to the reference time are stored in the storage device.

The first coefficient element e1 is a ratio of the immediately preceding output PW1 stored in the storage device in the output storage step S12 to the reference output PWb stored in the storage device in the output storage step S12. The second coefficient element e2 is a ratio of a current output PW2 received in the output reception step S11 under a condition where the gas turbine 10 outputs a maximum output in a current time period between the immediately preceding time period and the current time, to the immediately preceding output PW1 stored in the storage device in the output storage step S12.

In this aspect, similarly to the output corrector in the first aspect, it is possible to obtain the correction control output that appropriately reflects the degree of degradation of the output.

(17) According to the output correction program for a gas turbine 10 in a seventeenth aspect, in the output correction program for a gas turbine 10 in the sixteenth aspect, in the first coefficient element calculation step S21a, the first coefficient element e1 is calculated using the current output PW2 in the current time period instead of the immediately preceding output PW1 in the immediately preceding time period on a condition that a reset instruction is received. The correction coefficient creation step S20 further includes a coefficient element storage step S22 of storing the first coefficient element e1 calculated in the first coefficient element calculation step S21a, and the second coefficient element e2 calculated in the second coefficient element calculation step S21b, in the storage device, and a reset step S23 of resetting the second coefficient element e2 stored in the storage device in the coefficient element storage step S22, to a value that does not affect a calculation result of the correction coefficient in the correction coefficient calculation step S24, when the reset instruction is received.

In the correction coefficient calculation step S24, the correction coefficient is calculated using the second coefficient element e2 and the first coefficient element e1 stored in the storage device in the coefficient element storage step S22.

In this aspect, similarly to the output corrector in the second aspect, even when a trial operation is started from a state where the gas turbine 10 is completely stopped, it is possible to obtain the correction control output that appropriately reflects the degree of degradation of the output.

(18) According to the output correction program for a gas turbine 10 in an eighteenth aspect, in the output correction program for a gas turbine 10 according to the sixteenth or seventeenth aspect, the reference time is a design time for the gas turbine 10, and the reference output PWb is a design output under a condition where the gas turbine 10 outputs a maximum output at the design time.

(19) According to the output correction program for a gas turbine 10 in a nineteenth aspect, in the output correction program for a gas turbine 10 according to the eighteenth aspect, the immediately preceding time period includes a time period during a construction trial operation that is a trial operation performed after the gas turbine 10 is constructed, and that excludes a trial operation after the gas turbine 10 is inspected or repaired. The immediately preceding output PW1 includes a construction output PWc that is an output received in the output reception step S11 under a condition where the gas turbine 10 outputs a maximum output in the time period during the construction trial operation. The correction coefficient creation step S20 further includes a third coefficient element calculation step S21c of calculating a third coefficient element e3. In the correction coefficient calculation step S24, the correction coefficient is calculated using the first coefficient element e1, the second coefficient element e2, and the third coefficient element e3. The third coefficient element e3 is a ratio of the construction output PWc stored in the storage device in the output storage step S12 to the reference output PWb stored in the storage device in the output storage step S12.

In this aspect, similarly to the output corrector in the fifth aspect, it is possible to indicate the degree of degradation of the output until the current time period, with respect to the construction output PWc that is a measured output during the construction trial operation.

For example, a control program 103p for a gas turbine 10 in the above embodiment is understood as follows.

(20) According to a twentieth aspect, there is provided a control program for a gas turbine 10, which includes the output correction program for the gas turbine 10 according to any one of the sixteenth to nineteenth aspects, the program causing the computer to execute: a command value creation step S32 of creating a command value for a control target of the gas turbine 10 using the correction control output obtained by executing the output correction program; and a control signal output step S33 of outputting a control signal indicating the command value to the control target.

In this aspect, similarly to the control device in the twelfth aspect, it is possible to suppress the occurrence of a control failure of the control target.

INDUSTRIAL APPLICABILITY

In one aspect of the present disclosure, it is possible to obtain the control output capable of suppressing the occurrence of a control failure of the control target caused by a degradation in performance of the gas turbine.

REFERENCE SIGNS LIST

10: gas turbine
11: compressor
12: compressor casing
13: compressor rotor
14: IGV
15: guide vane
16: driver
21: turbine
22: turbine casing
23: turbine rotor
28: gas turbine rotor
24: intermediate casing
25: exhaust casing
29: generator
31: combustor
32: outer cylinder
33: combustion cylinder
41: fuel nozzle
42: inner cylinder
43: pilot burner
44: pilot nozzle
45: pilot air cylinder
48: pilot air flow path
49: diffusion flame
51: top hat nozzle
52: compressed air flow path
53: main burner
54: main nozzle
55: main air inner cylinder
56: main air outer cylinder
57: partition plate
58: main air flow path
59: premixed flame
60: fuel line
61: pilot fuel line
62: main fuel line
63: top hat fuel line
65: pilot fuel valve
66: main fuel valve
67: top hat fuel valve
71: rotation speed meter
72: output meter
73: intake air temperature sensor
74: intake air pressure gauge
75: blade path temperature sensor
76: exhaust gas temperature sensor
100: control device
101: CPU
102: main storage device
103: auxiliary storage device
103p: control program
103pa: output correction program
104: input device
105: display device
106: input/output interface
107: device interface
108: communication interface
109: storage and reproduction device
110: command value creation unit
120: combustion load command generator
121a: 700° C. MW computation unit
121b: 1500° C. MW computation unit
122: standard atmospheric pressure generator
123: first divider
124a: first multiplier
124b: second multiplier
125a: first subtractor
125b: second subtractor
126: second divider
127: limiter
130: fuel flow rate command generator
131: governor controller
132: load controller 133: blade path temperature controller
134: exhaust gas temperature controller
135: low value selector
136: limiter
140: flow rate ratio calculator
141: pilot ratio calculator
142: top hat ratio calculator
150: valve command value creator
151: first multiplier
152: second multiplier
153: first subtractor
154: second subtractor
155: PL valve command value computation unit
157: M valve command value computation unit
156: TH valve command value computation unit
160: IGV command value creator
170: limit output creator
180: output corrector
181: output reception unit
182: output storage unit
183: correction coefficient creation unit
184a: first coefficient element calculation unit
184b: second coefficient element calculation unit
184c: third coefficient element calculation unit
185: coefficient element storage unit
185a: first coefficient element storage unit
185b: second coefficient element storage unit
185c: third coefficient element storage unit
186: reset unit
187: correction coefficient calculation unit
187a: first correction coefficient calculation unit
187b: second correction coefficient calculation unit
187s: divider
187t: multiplier
187u: correction coefficient adjustor
188: output correction unit
188a: first output correction unit
188b: second output correction unit
188c: third output correction unit
188s: divider
188t: multiplier
188u: adder
188v: low value selector
188x: first storage unit
188y: second storage unit
190: control signal output unit
IGVc: IGV command value
e1: first coefficient element
e2: second coefficient element
e3: third coefficient element
K1: first correction coefficient
K2: second correction coefficient
PW: output (measured output)
PWr: demand output
PWb: reference output
PWc: construction output
PW1: immediately preceding output
PW2: current output

The invention claimed is:

1. An output corrector for a gas turbine including a compressor that compresses air to generate compressed air, a combustor that combusts fuel in the compressed air to generate combustion gas, and a turbine to be driven by the combustion gas, the output corrector comprising:
a correction coefficient creation unit that creates a correction coefficient to be used when a control output of the gas turbine is corrected;
an output correction unit that corrects the control output using the correction coefficient, and that outputs a corrected control output as a correction control output;
an output reception unit that receives at least an output from an output meter that detects an output of the gas turbine; and
an output storage unit that stores the output received by the output reception unit,
wherein the correction coefficient creation unit includes a first coefficient element calculation unit that calculates a first coefficient element, a second coefficient element calculation unit that calculates a second coefficient element, and a correction coefficient calculation unit that calculates the correction coefficient using the first coefficient element and the second coefficient element,
the output storage unit stores a reference output that is an output under a condition where the gas turbine outputs a maximum output at a reference time in the past, and an immediately preceding output that the output reception unit receives under a condition where the gas turbine outputs a maximum output in an immediately preceding time period closer to a current time than to the reference time,
the first coefficient element is a ratio of the immediately preceding output stored in the output storage unit to the reference output stored in the output storage unit, and
the second coefficient element is a ratio of a current output that the output reception unit receives under a condition where the gas turbine outputs a maximum output in a current time period between the immediately preceding time period and the current time, to the immediately preceding output stored in the output storage unit.

2. The output corrector for a gas turbine according to claim 1,
wherein the first coefficient element calculation unit calculates the first coefficient element using the current output in the current time period instead of the immediately preceding output in the immediately preceding time period on a condition that a reset instruction is received,
the correction coefficient creation unit further includes a coefficient element storage unit that stores the first coefficient element calculated by the first coefficient element calculation unit, and the second coefficient element calculated by the second coefficient element calculation unit, and a reset unit that resets the second coefficient element stored in the coefficient element storage unit, to a value that does not affect a calculation result of the correction coefficient by the correction coefficient calculation unit, when the reset instruction is received, and
the correction coefficient calculation unit calculates the correction coefficient using the second coefficient element and the first coefficient element stored in the coefficient element storage unit.

3. The output corrector for a gas turbine according to claim 1,
wherein the correction coefficient calculation unit calculates the correction coefficient by multiplying the first coefficient element by the second coefficient element.

4. The output corrector for a gas turbine according to claim 1,
wherein the reference time is a design time for the gas turbine, and the reference output is a design output under a condition where the gas turbine outputs a maximum output at the design time.

5. The output corrector for a gas turbine according to claim 4,
- wherein the immediately preceding time period includes a time period during a construction trial operation that is a trial operation performed after the gas turbine is constructed, and that excludes a trial operation after the gas turbine is inspected or repaired,
- the immediately preceding output includes a construction output that is an output that the output reception unit receives under a condition where the gas turbine outputs a maximum output in the time period during the construction trial operation,
- the correction coefficient creation unit further includes a third coefficient element calculation unit that calculates a third coefficient element,
- the correction coefficient calculation unit calculates the correction coefficient using the first coefficient element, the second coefficient element, and the third coefficient element, and the third coefficient element is a ratio of the construction output stored in the output storage unit to the reference output stored in the output storage unit.

6. The output corrector for a gas turbine according to claim 5,
- wherein the correction coefficient calculation unit divides a value obtained by multiplying the first coefficient element by the second coefficient element, by the third coefficient element, and calculates the correction coefficient based on a value obtained after the division, or multiplies a value obtained by dividing the first coefficient element by the third coefficient element, by the second coefficient element, and calculates the correction coefficient based on a value obtained after the multiplication.

7. The output corrector for a gas turbine according to claim 1,
- wherein the control output is a measured output that the output reception unit receives from the output meter at the current time.

8. The output corrector for a gas turbine according to claim 1,
- wherein the control output is a limit output determined according to a temperature of the air suctioned by the compressor at the current time.

9. The output corrector for a gas turbine according to claim 1,
- wherein the control output is an output of the gas turbine when it is assumed that an inlet temperature, which is a temperature of the combustion gas that has reached an inlet of the turbine from the combustor, is a predetermined temperature at the current time.

10. A control device for a gas turbine, the control device comprising:
- the output corrector for the gas turbine according to claim 1;
- a command value creation unit that creates a command value for a control target of the gas turbine using the correction control output obtained by the output corrector; and
- a control signal output unit that outputs a control signal indicating the command value to the control target.

11. An output correction method for a gas turbine including a compressor that compresses air to generate compressed air, a combustor that combusts fuel in the compressed air to generate combustion gas, and a turbine to be driven by the combustion gas, the output correction method comprising:
- executing a correction coefficient creation step of creating a correction coefficient to be used when a control output of the gas turbine is corrected;
- executing an output correction step of correcting the control output using the correction coefficient, and outputting a corrected control output as a correction control output;
- executing an output reception step of receiving at least an output from an output meter that detects an output of the gas turbine; and
- executing an output storage step of storing the output received in the output reception step,
- wherein the correction coefficient creation step includes a first coefficient element calculation step of calculating a first coefficient element, a second coefficient element calculation step of calculating a second coefficient element, and a correction coefficient calculation step of calculating the correction coefficient using the first coefficient element and the second coefficient element,
- in the output storage step, a reference output that is an output under a condition where the gas turbine outputs a maximum output at a reference time in the past, and an immediately preceding output received in the output reception step under a condition where the gas turbine outputs a maximum output in an immediately preceding time period closer to a current time than to the reference time are stored,
- the first coefficient element is a ratio of the immediately preceding output stored in the output storage step to the reference output stored in the output storage step, and
- the second coefficient element is a ratio of a current output received in the output reception step under a condition where the gas turbine outputs a maximum output in a current time period between the immediately preceding time period and the current time, to the immediately preceding output stored in the output storage step.

12. The output correction method for a gas turbine according to claim 11,
- wherein in the first coefficient element calculation step, the first coefficient element is calculated using the current output in the current time period instead of the immediately preceding output in the immediately preceding time period on a condition that a reset instruction is received,
- the correction coefficient creation step further includes a coefficient element storage step of storing the first coefficient element calculated in the first coefficient element calculation step, and the second coefficient element calculated in the second coefficient element calculation step, and a reset step of resetting the second coefficient element stored in the coefficient element storage step, to a value that does not affect a calculation result of the correction coefficient in the correction coefficient calculation step, when the reset instruction is received, and
- in the correction coefficient calculation step, the correction coefficient is calculated using the second coefficient element and the first coefficient element stored in the coefficient element storage step.

13. The output correction method for a gas turbine according to claim 11,
- wherein the reference time is a design time for the gas turbine, and the reference output is a design output under a condition where the gas turbine outputs a maximum output at the design time.

14. The output correction method for a gas turbine according to claim 13, wherein the immediately preceding time period includes a time period during a construction trial operation that is a trial operation performed after the gas turbine is constructed, and that excludes a trial operation after the gas turbine is inspected or repaired, the immediately preceding output includes a construction output that is an output received in the output reception step under a condition where the gas turbine outputs a maximum output in the time period during the construction trial operation, the correction coefficient creation step further includes a third coefficient element calculation step of calculating a third coefficient element, in the correction coefficient calculation step, the correction coefficient is calculated using the first coefficient element, the second coefficient element, and the third coefficient element, and the third coefficient element is a ratio of the construction output stored in the output storage step to the reference output stored in the output storage step.

15. A control method for a gas turbine, the control method comprising:

executing the output correction method for the gas turbine according to claim 11;

executing a command value creation step of creating a command value for a control target of the gas turbine using the correction control output obtained by the output correction method; and executing a control signal output step of outputting a control signal indicating the command value to the control target.

16. A non-transitory computer-readable storage medium storing an output correction program for a gas turbine including a compressor that compresses air to generate compressed air, a combustor that combusts fuel in the compressed air to generate combustion gas, and a turbine to be driven by the combustion gas, the output correction program causing a computer to execute:

a correction coefficient creation step of creating a correction coefficient to be used when a control output of the gas turbine is corrected;

an output correction step of correcting the control output using the correction coefficient, and outputting a corrected control output as a correction control output;

an output reception step of receiving at least an output from an output meter that detects an output of the gas turbine; and an output storage step of storing the output received in the output reception step, in a storage device of the computer, wherein the correction coefficient creation step includes a first coefficient element calculation step of calculating a first coefficient element, a second coefficient element calculation step of calculating a second coefficient element, and a correction coefficient calculation step of calculating the correction coefficient using the first coefficient element and the second coefficient element, in the output storage step, a reference output that is an output under a condition where the gas turbine outputs a maximum output at a reference time in the past, and an immediately preceding output received in the output reception step under a condition where the gas turbine outputs a maximum output in an immediately preceding time period closer to a current time than to the reference time are stored in the storage device, the first coefficient element is a ratio of the immediately preceding output stored in the storage device in the output storage step to the reference output stored in the storage device in the output storage step, and the second coefficient element is a ratio of a current output received in the output reception step under a condition where the gas turbine outputs a maximum output in a current time period between the immediately preceding time period and the current time, to the immediately preceding output stored in the storage device in the output storage step.

17. The non-transitory computer-readable storage medium according to claim 16, wherein in the first coefficient element calculation step, the first coefficient element is calculated using the current output in the current time period instead of the immediately preceding output in the immediately preceding time period on a condition that a reset instruction is received, the correction coefficient creation step further includes a coefficient element storage step of storing the first coefficient element calculated in the first coefficient element calculation step, and the second coefficient element calculated in the second coefficient element calculation step, in the storage device, and a reset step of resetting the second coefficient element stored in the storage device in the coefficient element storage step, to a value that does not affect a calculation result of the correction coefficient in the correction coefficient calculation step, when the reset instruction is received, and in the correction coefficient calculation step, the correction coefficient is calculated using the second coefficient element and the first coefficient element stored in the storage device.

18. The non-transitory computer-readable storage medium according to claim 16, wherein the reference time is a design time for the gas turbine, and the reference output is a design output under a condition where the gas turbine outputs a maximum output at the design time.

19. The non-transitory computer-readable storage medium according to claim 18, wherein the immediately preceding time period includes a time period during a construction trial operation that is a trial operation performed after the gas turbine is constructed, and that excludes a trial operation after the gas turbine is inspected or repaired, the immediately preceding output includes a construction output that is an output received in the output reception step under a condition where the gas turbine outputs a maximum output in the time period during the construction trial operation, the correction coefficient creation step further includes a third coefficient element calculation step of calculating a third coefficient element, in the correction coefficient calculation step, the correction coefficient is calculated using the first coefficient element, the second coefficient element, and the third coefficient element, and the third coefficient element is a ratio of the construction output stored in the storage device in the output storage step to the reference output stored in the storage device in the output storage step.

20. A non-transitory computer-readable storage medium storing a control program for a gas turbine, which comprises the output correction program for the gas turbine according to claim 16, the control program causing the computer to execute:

a command value creation step of creating a command value for a control target of the gas turbine using the correction control output obtained by executing the output correction program; and a control signal output step of outputting a control signal indicating the command value to the control target.

* * * * *